United States Patent [19]
Kobayashi et al.

[11] Patent Number: 5,630,007
[45] Date of Patent: May 13, 1997

[54] CLIENT-SERVER SYSTEM WITH PARITY STORAGE

[75] Inventors: Tsuyoshi Kobayashi; Shunichiro Nakamura; Harumi Minemura; Tomohisa Yamaguchi, all of Tokyo, Japan

[73] Assignee: Mitsubishi Denki Kabushiki Kaisha, Tokyo, Japan

[21] Appl. No.: 621,227

[22] Filed: Mar. 25, 1996

[30] Foreign Application Priority Data

Mar. 30, 1995 [JP] Japan .................. 7-073929
Oct. 31, 1995 [JP] Japan .................. 7-283473

[51] Int. Cl.$^6$ .................. H04N 5/91; H04N 9/79
[52] U.S. Cl. .................. 386/113; 386/125; 348/7
[58] Field of Search .................. 386/46, 45, 125; 348/7, 13, 12; 455/5.1; 395/200.08, 200.09, 200.05; H04N 5/91, 9/79

[56] References Cited

U.S. PATENT DOCUMENTS

| | | | |
|---|---|---|---|
| 5,303,383 | 4/1994 | Neches et al. | 395/500 |
| 5,321,813 | 6/1994 | McMillen et al. | 370/60 |
| 5,377,051 | 12/1994 | Lane et al. | 386/81 |
| 5,410,343 | 4/1995 | Coddington et al. | 348/7 |
| 5,440,336 | 8/1995 | Buhro et al. | 348/13 |
| 5,442,389 | 8/1995 | Blahut et al. | 348/7 |
| 5,508,732 | 4/1996 | Bottomley et al. | 348/7 |
| 5,508,733 | 4/1996 | Kassatly | 348/13 |
| 5,522,046 | 5/1996 | McMillen et al. | 395/200.15 |
| 5,555,244 | 9/1996 | Gupta et al. | 370/60.1 |

FOREIGN PATENT DOCUMENTS 0369707 5/1990 European Pat. Off. .
0485110 5/1992 European Pat. Off. .
2291229 1/1996 United Kingdom .

OTHER PUBLICATIONS

Nemzow, Martin, "Tuning the Unix Environment," Stacks, vol. 3, No. 2, pp. 23–28 Feb. 1995.

Henderson, Tom, "The Multimedia Menace: with Massive Multimedia Files Traveling the Network, Administrators Must Learn to Streamline Audio, Video," LAN Magazine, vol. 9, No. 12, pp. 138–146. Nov. 1994.

McGoveran, David, "The Origin of the Server Species: Can File Servers Evolve Into Database Servers . . . or Vice Versa?" LAN Technology, vol. 8, No. 6, pp. 59–66 Jun. 1992.

*Primary Examiner*—Tommy P. Chin
*Assistant Examiner*—Y. Lee
*Attorney, Agent, or Firm*—Wolf, Greenfield & Sacks, P.C.

[57] ABSTRACT

The invention relates to a client-server system which improves efficiency of each server by distributing loads to a plurality of servers. The a client-server system comprises a plurality of storages for sequentially storing data which are distributed in each of the plurality of storages; a plurality of servers, each of which is connected to the plurality of storages, for accessing the data distributed and stored in each of the plurality of storages; an administration apparatus which is connected to the plurality of servers for administrating the data sequentially stored in the plurality of storages, and the plurality of servers; and a client which is connected to both the administration apparatus and the plurality of servers, the clients specifies a server which is connected to a storage where a head block of the data is stored by inquiring to the administration apparatus, and accesses the data in the plurality of servers according to the order of the data storage sequence from the specified server.

4 Claims, 31 Drawing Sheets

| NUMBER OF SERVER COMPUTER : S = 3 | | NUMBER OF DISKS FOR EACH SERVER : D = 2 | |
|---|---|---|---|
| VIDEO NAME | HEAD BLOCK NO. | NUMBER OF BLOCKS | CLIENT IN ACCESS |
| 1 | 0 | 12 | 5c |
| 2 | 12 | 15 | |
| 3 | 27 | 11 | |
| 4 | 38 | 14 | 5a |
| 5 | 52 | 13 | |
| 6 | 65 | 13 | 5b, 5d |

FIG. 3

| NUMBER OF SERVER COMPUTER : S | | | NUMBER OF DISKS IN EACH SERVER : D | |
|---|---|---|---|---|
| EXISTENCE OF FAULT SERVER | LOCATION OF FAULT SERVER | | LOCATION OF SERVER FOR COPY | |
| VIDEO NAME | HEAD BLOCK NO. | NUMBER OF BLOCKS | CLIENT IN ACCESS | |
| 1 | 0 | 12 | 5c | |
| 2 | 12 | 15 | | |
| 3 | 27 | 11 | 5b | 5d |
| 4 | 38 | 14 | 5a | |
| .. | .. | .. | .. | |

FIG. 7

| NUMBER OF SERVER COMPUTER : S | | NUMBER OF DISKS IN EACH SERVER : D | | | |
|---|---|---|---|---|---|
| EXISTENCE OF FAULT SERVER | | LOCATION OF FAULT SERVER | | | |
| VIDEO NAME | HEAD BLOCK NO. | NUMBER OF BLOCKS | STATUS | CLIENT IN ACCESS | |
| 1 | 0 | 12 | NORMAL | 5c | |
| 2 | 12 | 15 | NORMAL | | |
| 3 | 27 | 11 | NORMAL | 5b | 5d |
| 4 | 38 | 14 | NORMAL | 5a | |
| .. | .. | .. | .. | .. | |

FIG. 12

CLIENT-SERVER SYSTEM WITH PARITY STORAGE

BACKGROUND OF THE INVENTION

1. Field of the Invention

The present invention relates to a data storage/access system, and a data restoration system when a system fault occurs, in a client-server system which consists of a plurality of servers and clients inter-connected.

2. Description of the Prior Art

In recent years, an enthusiastic research and development have been achieved on a video server which stores a lot of video programs such as movies, and distributes moving pictures upon a demand from a client. In a conventional video server system, when a whole system needs extension due to lack of capacity of server computers, it has been solved by replacing the old ones with a higher performance server computer, or by increasing the number of server computers so that a load of processing is distributed over a plurality of server computers. The latter way of extending the system by increasing the number of server computers is effective in terms of work load and cost. A video server as such is introduced in "A Tiger of Microsoft, United States, Video on Demand" in an extra volume of Nikkei Electronics titled "Technology which underlies Information Superhighway in the United States", pages 40, 41 published in Oct. 24, 1994 by Nikkei BP.

FIG. 31 is a block diagram showing a conventional video server system. The configuration of FIG. 31 comprises a network 1, server computers 2 which are connected to the network 1 and have a function as a video server, magnetic disk unit 3 which are connected to the server computers 2 and stores video programs, clients 5 which are connected to the network 1 and demand the server computers 2 to read out a video program. Each server computer 2 has a different plurality of set of video programs such as a movie stored in the magnetic disk units 3. A client 5 therefore reads out a video program via one of the server computers 2 which has a magnetic disk units 3 where a necessary video program is stored.

A conventional video server system where each one of a plurality of server computers stores an independent set of video program, the whole system is utilized efficiently when each demand on a video program is distributed to different server computers. However when a plurality of accesses rush into a certain video program, a work load increases on a server computer where this video program is stored, namely a work load disparity will be caused among server computers. Even if the other server computers remain idle, the whole capacity of the system has reached to the utmost level because of the overload on a capacity of a single computer. This deteriorates the efficiency of the whole system.

It is an object of the invention to provide a client-server system comprising a plurality of server computers in which a work load is distributed over all of the plurality of server computers to improve the efficiency of the whole system, even if there is a rush of access to a certain program.

It is another object of the invention to increase the reliability of the system when a fault occurred on the system.

SUMMARY OF THE INVENTION

According to one aspect of the invention, a client-server system comprises: (a) a plurality of storages for sequentially storing data which are distributed in each of the plurality of storages; (b) a plurality of servers, each of which is connected to the plurality of storages, for accessing the data distributed and stored in each of the plurality of storages; (c) an administration apparatus which is connected to the plurality of servers for administrating the data sequentially stored in the plurality of storages, and the plurality of servers; and (d) a client which is connected to both the administration apparatus and the plurality of servers comprising: (d1) an access demand means for specifying a server which is connected to a storage where a head block of the data is stored by inquiring to the administration apparatus, and for accessing the data in the plurality of servers according to the order of the data storage sequence from the specified server.

According to another aspect of the invention, each of the plurality of servers in the client-server system comprises, an intra-server parity generation means for generating parities from the data stored in the plurality of storages connected to each server, and for storing the generated parities into one of the plurality of storages connected to each server.

According to further aspect of the invention, each of the plurality of server of the client-server system comprises parity storages for storing the parities; and the intra-server parity generation means for storing the generated parities into the parity storages.

According to further aspect of the invention, each of the plurality of servers of the client-server system of claim 4 comprises an intra-server restoration means for restoring data which are stored in an inaccessible storage, using data which are stored in accessible storages and parities which are stored in accessible storages or the parity storage, when any one of the plurality of storages connected to each server becomes inaccessible.

According to further aspect of the invention, the client-server system comprises a storages connected to servers other than the server having a certain data store data which are identical with the data stored in one of the storages connected to the server.

According to further aspect of the invention, the client-server system comprises an administration apparatus, which further comprises, a parity storage for storing parities; and an inter-server parity generation means for generating parities from the data which are distributed and stored in each of the plurality of storages connected to the plurality of servers, and for storing the generated parities in the parity storage.

According to further aspect of the invention, the client-server system comprises an administration apparatus which further comprises, an inter-server restoration means for restoring data which are stored in an inaccessible storage, using data which are stored in accessible storages and parities which are stored in the parity storage, when any one of the plurality of storages connected to each server becomes inaccessible.

According to further aspect of the invention, the client-server system comprises an inter-server restoration means for storing the restored data into the parity storage.

According to further aspect of the invention, the client-server system comprises a client which further comprises, an intra-client restoration means for restoring data which are stored in an inaccessible storage, using data which are stored in accessible storages and parities which are stored in the parity storage, when any one of the plurality of storages connected to each server becomes inaccessible.

According to further aspect of the invention, the client-server system comprises an intra-client restoration means which further comprises, a buffer for storing data or parities for restoring the data into the buffer for restoring next data; and for simultaneously restoring data which are stored in any one of the storages connected to the inaccessible server, using the data or parities stored in the buffer.

According to further aspect of the invention, the client-server system comprises: (a) a plurality of storages for sequentially storing data which are distributed in each of the plurality of storages; (b) a plurality of servers, each of which is connected to the plurality of storages, for accessing the data distributed and stored in each of the plurality of storages; (c) an administration apparatus comprising which is connected to the plurality of servers, the administration apparatus comprises, (c1) an administration means for administrating the data sequentially stored in the plurality of storages, and the plurality of servers; (c2) a parity storage for storing parities; (c3) an inter-server parity generation means for generating parities from the data which are distributed and stored in each of the plurality of storages connected to the plurality of servers, and for storing the generated parities into the parity storage; and (c4) an inter-server restoration means for restoring data which are stored in an inaccessible storage, using data which are stored in accessible storages and parities which are stored in the parity storage, when any one of the plurality of storages connected to each server becomes inaccessible to the data, and for restoring the restored data into the parity storages; and (d) a client which is connected to both the administration apparatus and the plurality of servers, the client comprises: (d1) an access demand means for specifying a server which is connected to a storage where a head block of the data is stored by inquiring to the administration apparatus, and for accessing the data in the plurality of servers according to the order of the data storage sequence from the specified server, and for informing inter-server restoration means of a location of the inaccessible server when any one of the plurality of servers fails to access the data; and (d2) an inter-client restoration means, when sad access demand is impossible, for restoring data which are stored in an inaccessible storage, using data which are stored in accessible storages and parities which are stored in the parity storage, before the data are restored by the inter-client restoration means, and for accessing the restored data which are stored in the parity storages after the data are restored by the inter-client restoration means.

According to further aspect of the invention, the client-server system comprises an administration means which further comprises a standby storage for storing parities; the inter-server restoration means for copying the parities stored in the parity storage into the standby storage before restoring data; and the inter-client restoration means for restoring data stored in any one of the storages connected to the inaccessible server, using data stored in the storages connected to accessible other servers and parities copied in the standby storage, when the inter-server restoration means is carrying out data restoration.

According to further aspect of the invention, the client-server system comprises an administration apparatus which further comprises a second inter-server parity generation means for generating parities from the data which are distributed and stored in each of the plurality of storages connected to the plurality of servers, and for distributing and storing the generated parities in each of the plurality of storages connected to the plurality of servers.

According to further aspect of the invention, the client-server system comprises an administration apparatus which further comprises a second inter-server restoration means for restoring data stored in any one of the storages connected to an inaccessible server, using data stored in the storages connected to the accessible other servers and parities distributed and stored in each of the plurality of storages connected to the plurality of servers, when any one of the plurality of servers fails to access the data.

According to further aspect of the invention, the client in the client-server system comprises: a plurality of terminals which demand to transfer the data to the client; and a wide-area network which connects the plurality of terminals with the clients; wherein, the client operates as a concentrator which transfers the data demanded by each of the terminals to each of the terminals.

BRIEF DESCRIPTION OF THE DRAWINGS

FIG. 3 shows a diagram illustrating an administration table according to the first embodiment of the present invention.

FIG. 7 shows a diagram illustrating an administration table according to the third embodiment of the present invention.

FIG. 12 shows a diagram illustrating an administration table according to the fifth embodiment of the present invention.

DETAILED DESCRIPTION OF THE PREFERRED EMBODIMENTS

Embodiment 1.

Figure 1:
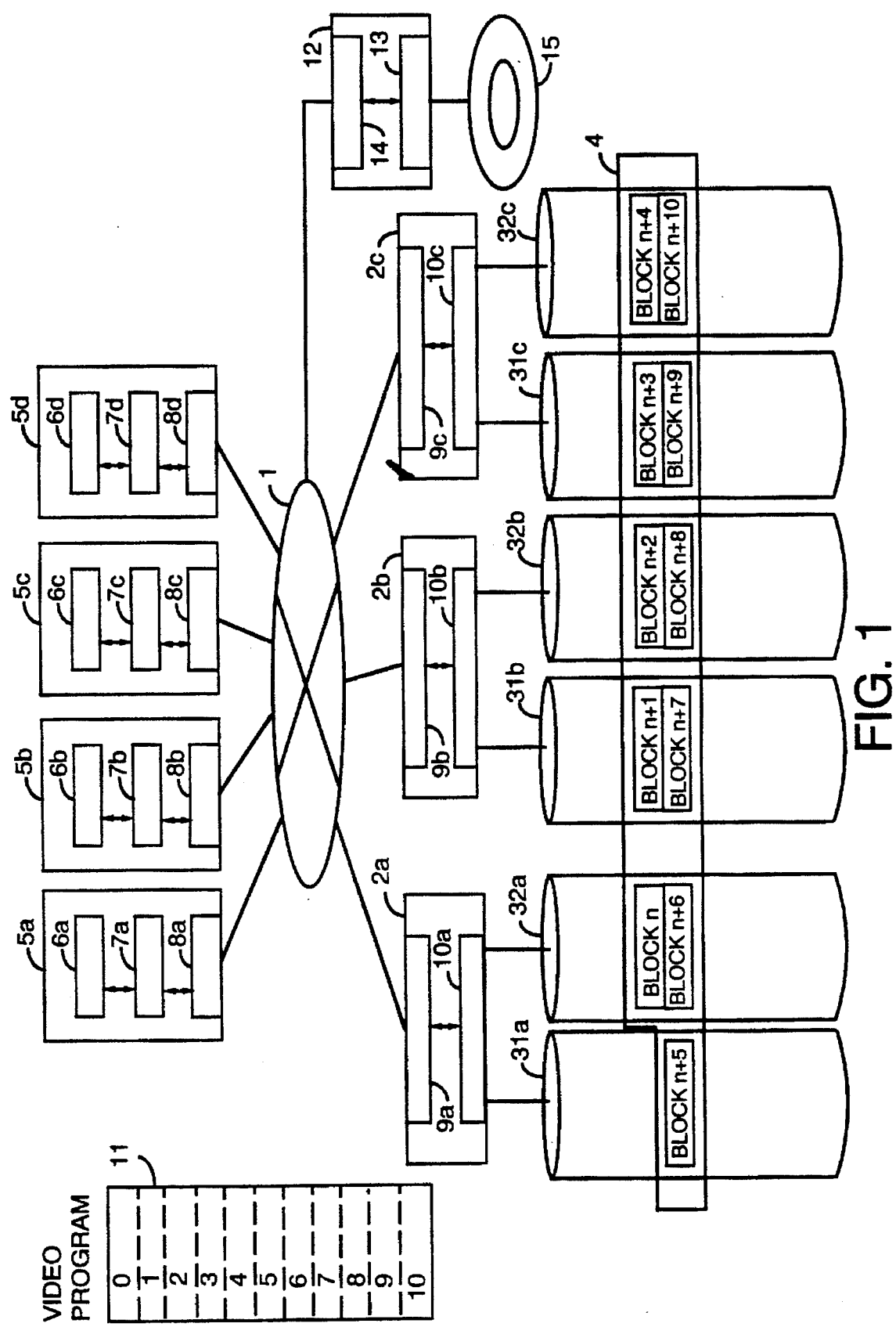
FIG. 1 shows a block diagram showing a construction of a client-server system according to a first embodiment of the present invention.

FIG. 1 is a block diagram showing a client-server system according to one embodiment of the present invention. The configuration of FIG. 1 comprises a network 1 such as Ethernet and ATM, server computers 2a, 2b and 2c which are connected to the network 1, magnetic disk units 31a, 32a, 31b, 32b, 31c and 32c connected to the server computers 2a, 2b and 2c, respectively, which sequentially store distributed video data, a video program 4 which has been divided (referred to as "striping") to be stored in the magnetic disk units 31a, 32a, 31b, 32b, 31c and 32c, client computers 5a~5d which are connected to the network 1 and receive video program 4, application programs 6a~6d which operate in the client computers 5a~5d, driver programs 7a~7d as an access demand means which demand access to the video program 4 having been divided and sequentially stored in magnetic disk units 31a, 32a, 31b, 32b, 31c and 32c in response to a demand to access from application programs 6a~6d, 31a, 32a, 31b, 32b and 31c, client-side network interfaces 8a~8d which carry out such process as TCP/IP protocol in the client computers 5a~5d and realize interfaces between clients and the network 1, server-side network interfaces 9a~9c which carry out such processes as TCP/IP protocol in the server computers 2a~2c and realizes interface between servers and the network 1, server programs 10a~10c which read data block out of magnetic disk units 31a, 32a, 31b, 32b, 31c and 32c to supply it to the server-side network interfaces 9a~9d, original video program 11 which has not yet been divided nor stored, administration computer 12 connected to the network 1, administration program 13 operated in the administration computer 12 which administrates the video program having been divided and stored in magnetic disk units 31a, 32a, 31b, 32b, 31c and 32c and the server computers 2a~2c, administration computer-side network interface 14 which carries out such process as TCP/IP protocol in the administration computer 12 and realizes an interface between the administration computer 12 and the network 1, and a large capacity storage 15 such as CD-ROM, which is connected to the computer 12 and the original video program 11 is stored therein.

Figure 2:
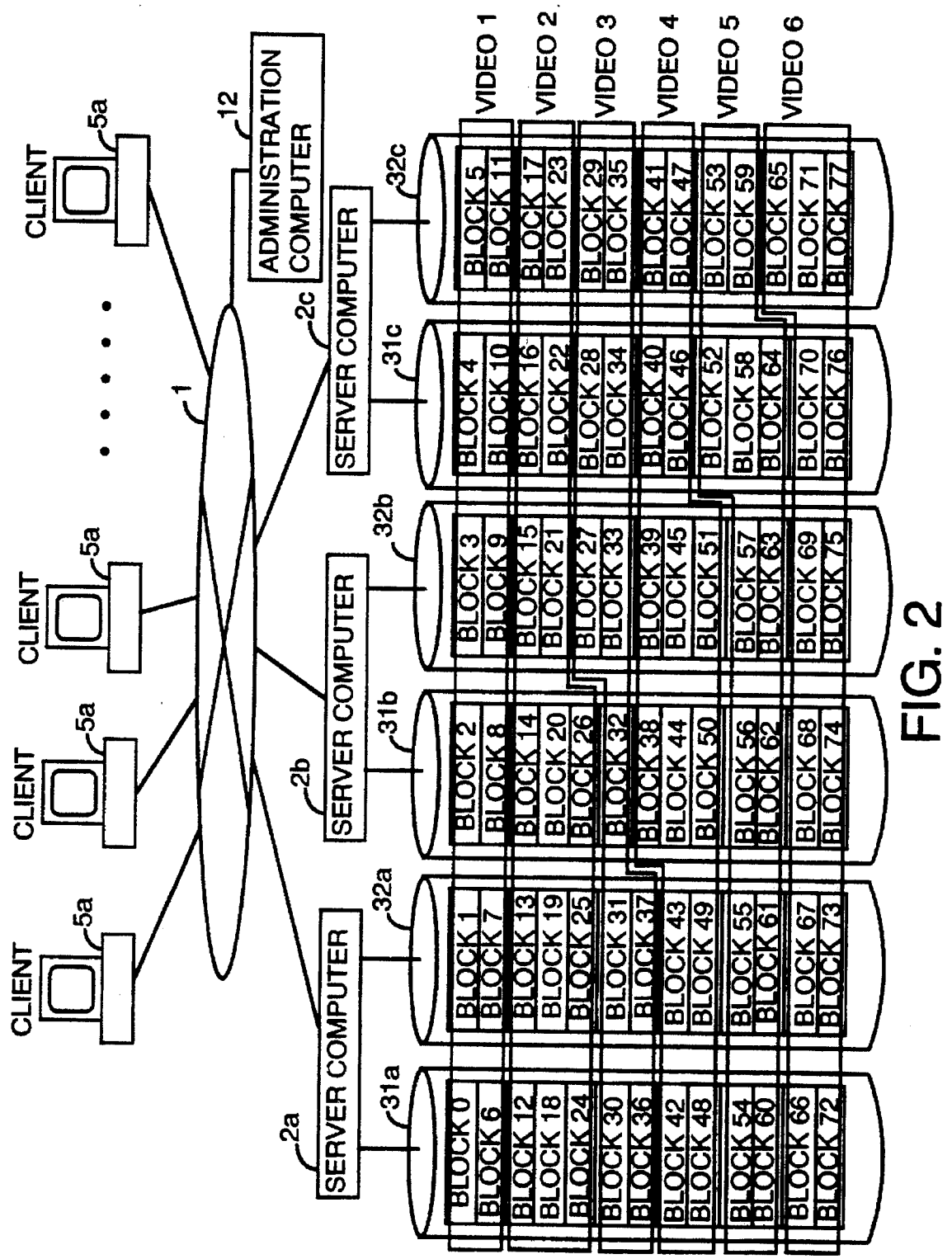
FIG. 2 shows a block diagram illustrating how video data are stored according to the first embodiment of the present invention.

FIG. 2 is a diagram for explaining how video data is stored. For the sake of simplification of the drawing, only two magnetic disk units are connected to each server computer in FIG. 2. In this FIG. 2, each of the three server computers 2a~2c is connected to two magnetic disk units, respectively, and also connected to the administration computer 12 and a plurality of client computers 5a~5d which are devices on the video-receiving side, via the network 1.

Each magnetic disk unit 31a, 32a, 31b, 32b, 31c and 32cc is divided into block units per a certain amount. In FIG. 2, six video programs, denoted by videos 1~6 are stored in 78 blocks denoted by blocks 0~77. Each video program is stored as if data was striped as shown in FIG. 2 where data has been divided and distributed over the plurality of the magnetic disk units 31a, 32a, 31b, 32b, 31c and 32c. Video 1 is sequentially stored in the blocks 0~11, and video 2 is sequentially stored in the blocks 12~26. Videos 3~6 are also stored in the blocks, respectively, as shown in FIG. 2.

FIG. 3 shows an administration table to administrate each configuration of the server computers 2a~2c and the video programs stored in the magnetic disk units 31a, 32a, 31b, 32b, 31c and 32c. This administration table is stored and retained in the administration program 13 shown in FIG. 1. The administration table is shown to correspond to each configuration of the server computers 2a~2c and the six video programs denoted by videos 1~6, where the number of the server computers (S) is three, the number of the disk unit (D) connected to each server computer is two, the head block number of video 1 is zero and the number of the blocks for video 1 is twelve, the head block number of video 2 is twelve and the number of the blocks for video 2 is twelve. The administration table of FIG. 3 also has client information on accessing the videos, which shows the client computer 5c is accessing the video 1, the client computer 5a is accessing the video 4.

The administration program 13 administrates access conditions to video programs by deleting unnecessary videos, storing a new video program, or responding to a client computer with necessary information when it accesses video programs.

An operation of the present embodiment is described as follows with reference to FIG. 1. First, a data storing system at an initial stage is explained as follows. The administration program 13 reads out an original video program 11 from large capacity storage 15 to divide it into a plurality of blocks by a fixed length. In FIG. 1, it is divided into eleven blocks. The administration program 13 sequentially stores each divided block to the magnetic disk units 31a, 32a, 31b, 32b, 31c and 32c connected to the server computers 2a~2c via the administration computer-side network interface 14, the network 1, the server-side network interfaces 9a~9c and the server programs 10a~10c.

Since each block number is decided corresponding to the data in the magnetic disk unit without selection, the client can calculates a server computer, a magnetic disk unit and a location of each data corresponding to each block number using the block number. For example, a method of calculation is shown as follows in case that the block 21 which is stored in the magnetic disk unit 32b of FIG. 2 is demanded by a client, where, ÷ represents a quotient of divisions, and % represents a remainder of divisions.

(a) Method for calculating the server:

block number÷the number of disk units % the number of servers= 21÷2% 3=1 (remainder)

where, 0: server computer 2a, 1: server computer 2b, and 2: server computer 2c.

Therefore, the result shows that the requested server is a server computer 2b.

(b) Method for calculating the disk unit:

block number % number of disk units=21% 2=1 (remainder)

where, 0: magnetic disk unit 31b, and 1: magnetic disk unit 32b.

Therefore, the result shows that the requested disk unit is a magnetic disk unit 32b.

(c) The method of calculating the location of the data:

block number÷(number of servers×number of disk units)=21÷(3× 2)=3 (quotient)

where, 0: first stage, and 1: second stage and so on.

Therefore the result shows that the requested location of the data is in a fourth stage.

Secondly, a data searching system is explained as follows.

Figure 4:
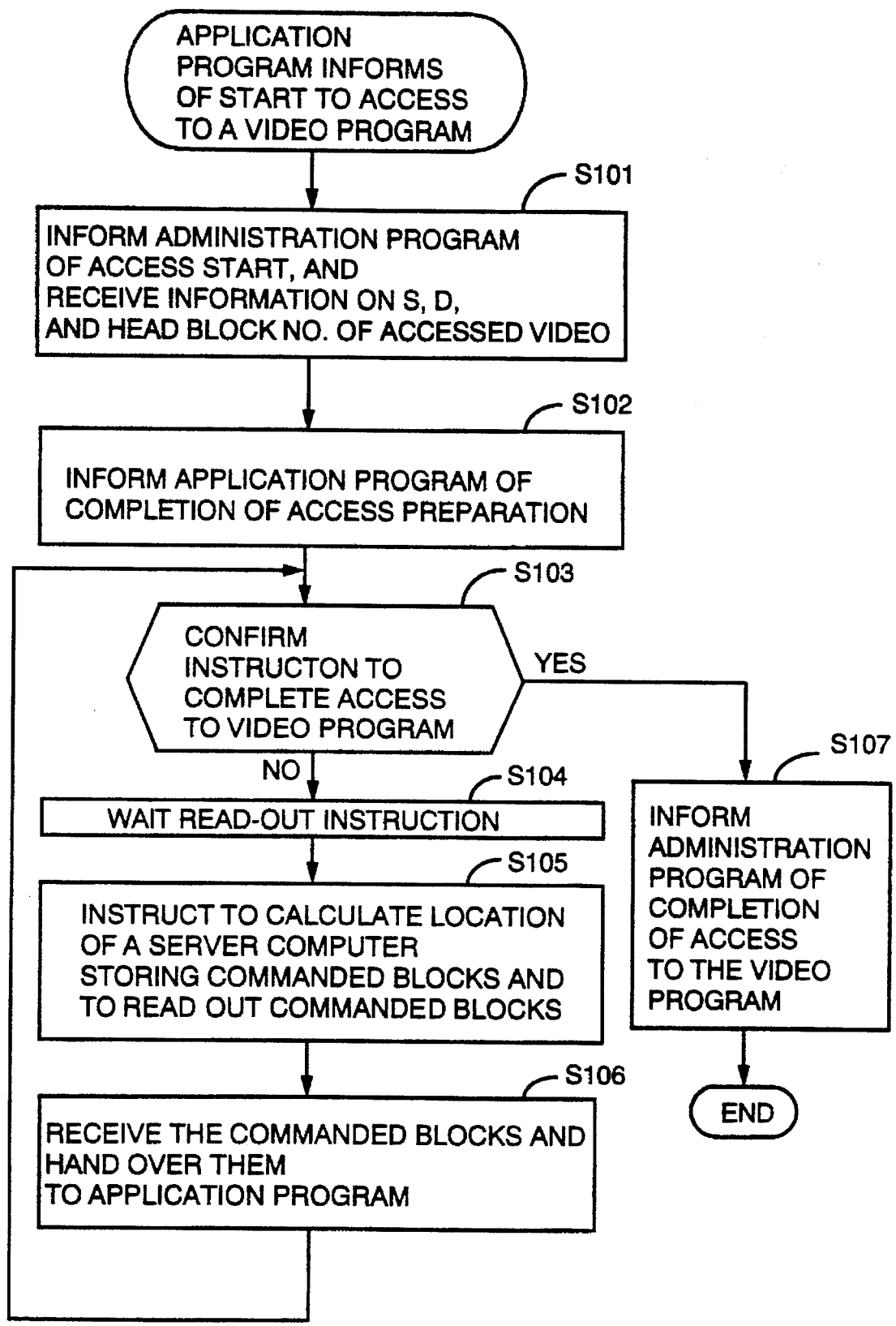
FIG. 4 shows a flow chart showing how a video program is read out according to the first embodiment of the present invention.

FIG. 4 is a flow chart showing procedure in which the driver programs 7a~7d read out data blocks of the video program 4 from server computers 2a~2c in response to a demand from the application programs 6a. The following is a description on procedure in which the application program 6a reads out the video program 4 with reference to the flow chart of FIG. 4.

Step 1: The application program 6a instructs the driver program 7a to start an access to the video program 4.

Step 2: The driver program 7a instructs the administration program 13 to start an access to the video program 4 via the client-side network interface 8a, the network 1, and administration computer-side network interface 14. The administration program 13 sets a flag to indicate that the client computer 5a accesses the video program 4 and simultaneously informs the driver program 7a of the number (S) of server computers, the number of magnetic disk units (D) connected to each server computers, and block number (n) of the head block of the video program 4 which is stored in the server computers (S 101). Since the driver program 7a can calculates the server computer, the magnetic disk unit and the location of data in which the arbitrary block is stored by the above calculations (a)~(c), the driver program 7a can subsequently specify the location of any arbitrary block with regard to the video program 4.

Step 3: The driver program 7a informs the application program 6a that an access preparation to the video program 4 has been completed (S 102).

Step 4: The application program 6a instructs the driver program 7a to read out the head block of the video program 4 (S 104).

Step 5: The driver routine 7a calculates the server computer, the magnetic disk unit and the location of data in which the data block which is demanded by the above calculations (a)~(c) is stored. In this case, since it is known that the head block is stored in the first stage of the magnetic disk unit 32a connected to the server computer 2a, the driver routine 7a accesses the server computer 2a via the client-side network interface 8a, the network 1, the server-side network interface 9a, and gives information on the above magnetic disk unit and the location of data. Then, the driver routine 7a instructs the server program 10a to read out the block n (S 105).

Step 6: The server program 10a starts to read out the block n from the magnetic disk unit 32a.

Step 7: The server program 10a transfers the block n to the driver program 7a via the server-side network interface 9a, the network 1 and the client-side network interface 8a.

Step 8: The driver program 7a hands over the block n to the application program 6a (S 106).

When the application program 6a demands sequentially to read out each block of the video program subsequently, the driver program 7a repeats the steps 5~8 to sequentially hand over each block of the video program 4 stored in the server computers 2a N 2c to the application program 6a.

Step 9: To terminate the access to the video program 4, the application program 6a instructs the driver program 7a to complete the access to the video program 4 (S 103).

Step 10: The driver program 7a informs the administration program 13 in the administration computer to terminate the access to the video program 4. The administration program 13 turns off the flag which is sent from the administration to the video program 4 of the client computer 5a (S 107).

If the application programs 6a~6d in the plurality of the client computers 5a~5d demand to read out the data of the same video program 4, the blocks demanded by each application program 6a~6d are usually different to each other. Since these blocks are divided and stored over the plurality of server computers 2a~2c, loads are distributed over these server computers, and the utilization efficiency over the all server computers 2a~2c is raised. For example, when the application program 6a demands the block n, the application program 6b demands block n+1, and the application program 6c demands block n+9, the block n, the block n+1 and the block n+9 are transferred from the server computer 2a, 2b and 2c, respectively, and the procedures for each demand are carried out simultaneously in the different server computers 2a~2c.

According to the first embodiment, a necessary portion of a necessary video program is read out by sequentially switching each server computer. Accordingly, the utilization efficiency of each server computer is raised by distributing loads over a plurality of server computers.

Moreover, in this first embodiment, the administration program 13 is asked the number (S) of server computers as well as the number of magnetic disk units (D) connected to each server computer. Therefore, even if the number of the server computers increases along with the increase in the amount of data, neither reconstruction nor modification of settings is required to driver programs 7a~7d. It is advantageous that client computers are not affected if the number of the server computers is increased because the administration program 13 can reallocate each block of the video program data stored in the magnetic disk units to the already connected magnetic disk units and newly extended magnetic disk units.

In this first embodiment, the administration computer 12 is dealt with a different computer from the server computers 2a–2c. However a modification can be made so that any one of these server computers (for example, server computer 2a) has also a function equivalent to the administration computer 12.

Embodiment 2.

Figure 5:
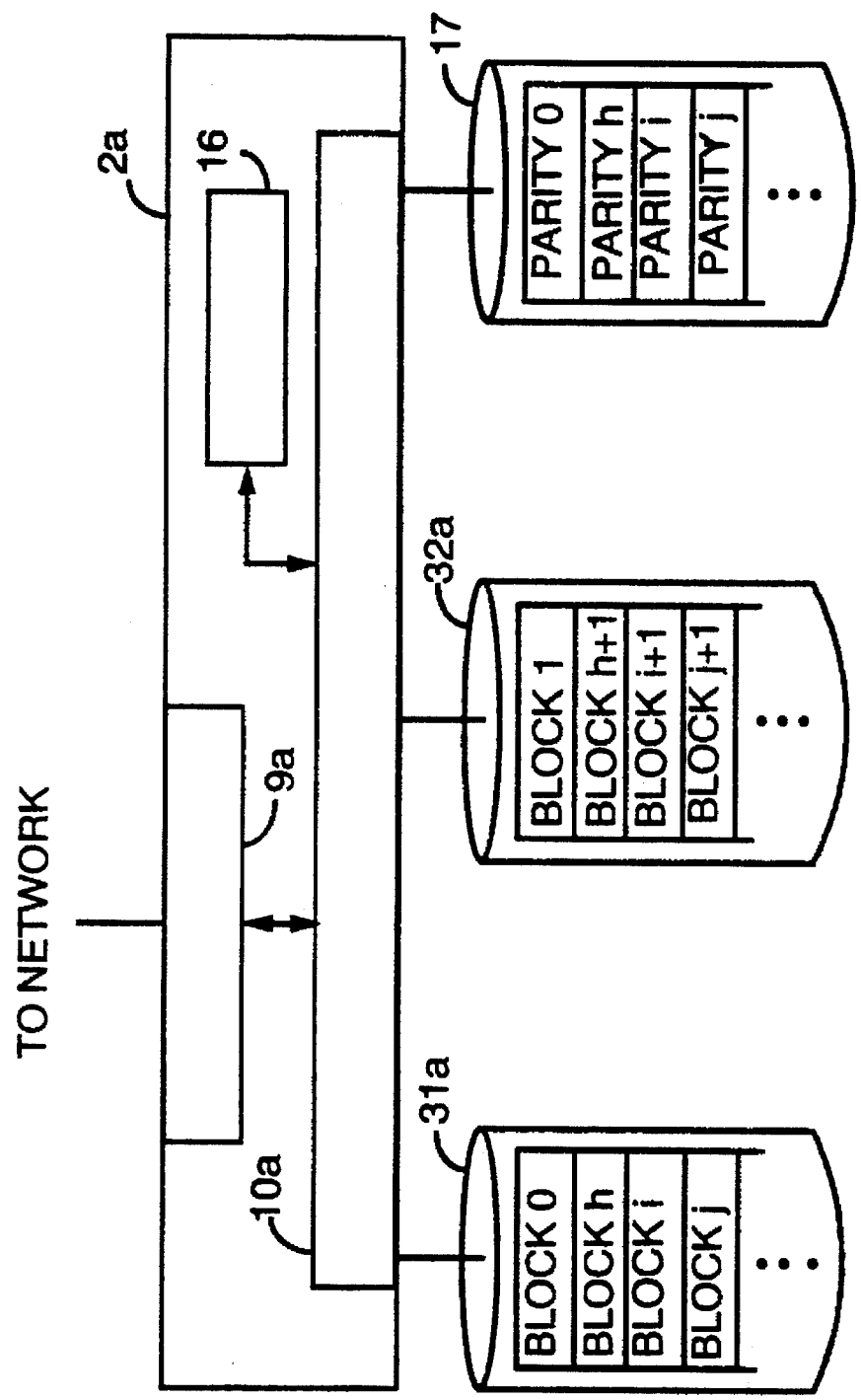
FIG. 5 shows a block diagram showing a construction inside a server computer according to a second embodiment of the present invention.

FIG. 5 is a diagram showing an internal configuration of a server computer and how video program data is stored, according to the second embodiment. The second embodiment as shown in FIG. 5 is different from the first embodiment as shown in FIG. 1 in the internal configuration of each server computer and how video program data is stored. The elements having the same reference numbers in FIG. 2 are the same portions or the corresponding portions in FIG. 1. Accordingly the detailed explanation of the same portions is omitted.

The configuration of FIG. 5 comprises intra-server disk unit array administration means 16 which has a function as an intra-server parity generation means for generating parities when video program data is stored as well as a function as an intra-server restoration means for restoring data when one of magnetic disk units 31a, 32a is inaccessible, for example, due to fault, and magnetic disk unit 17 for storing parities generated from the video program data. In FIG. 5A, a server computer 2a is connected to two magnetic disk units 31a, 32a for storing data and a magnetic disk unit 17 for storing parities.

An operation of the second embodiment is described as follows with reference to FIG. 5.

Step 1: Data to be stored are received via the server-side network interface 9a from the network.

Step 2: The server program 10a divides the received data into block units in the same way as the first embodiment. Each divided data is then stored in the data-storing magnetic disk units 31a and 32a.

Step 3: The intra-server disk unit array administration means 16 instructs the server program 10a to write parities which corresponds to each data in the parity-storing magnetic disk unit 17. The parities are generated by the following calculation:

parity 0=block 0 (+) block 1 parity h=block h (+) block h+1 parity i=block i (+) block i+1 where, (+) represents Exclusive OR arithmetic in this specification.

In this second embodiment, a data storing system of the video program is the same as that of the first embodiment. Since client computers disregard the magnetic disk unit for storing parities 17, the procedure to read out data is carried out in the same manner as that of the first embodiment.

The following is an explanation on the operation when the magnetic disk unit 32a faults.

If the server program 10a detects any fault such as no-response when it accesses to the magnetic disk unit 32a in response to a demand from a client computer, the server program 10a informs this state to the intra-server disk unit array administration means 16. The intra-server disk unit array administration means 16 then regards the magnetic disk unit 32a as faulted, and moves to a degeneracy state.

In the degeneracy state, when a client computer demands to read out a data block stored in the fault magnetic disk unit 32a, the intra-server disk unit array administration means 16 calculates the data block stored in this magnetic disk unit 32a which is damaged, from the data stored in the other magnetic disk unit 31a and the parities stored in parity-storing magnetic disk unit 17 using the following equations.

block 1=block 0 (+) parity 0 block h+1=block h (+) parity h block i+1=block i (+) parity i

The calculated data by the intra-server magnetic disk unit 16 is transferred to the client computer.

Having replaced a new magnetic disk unit for the fault magnetic disk unit 32, the system operates so that the data stored in the fault magnetic disk unit 32a is reloaded to the new magnetic disk unit in the background, while responding to a demand from a client computer in the degeneracy state. Accordingly, the system is recovered to the original state without any operational interruption. Since this procedure of reloading data can be executed in the on-line state, the data can be read out and transferred from that new magnetic disk unit if the data has been already reloaded to the other new magnetic disk unit even if the demand is directed to the damaged magnetic disk unit by the client computer. If the data has not yet been reloaded completely into the new magnetic disk unit, the demanded data is restored by executing the calculation using the above-mentioned equations, and then transferred to the client computer.

According to this second embodiment, the degeneracy process as discussed in the above is carried out when one of a magnetic disk unit becomes inaccessible due to fault and so on. This increases the reliability of the system. Moreover client computers 5a–5d and the administration program 13 in the administration computer 12 are not affected by the above degeneracy process, since it is carried out exclusively within each server computer.

In this second embodiment, the magnetic disk unit for storing parities is exclusively prepared in the system. However the magnetic disk unit for storing parities and those for storing data are not necessarily separated to each other, and a modification can be made so that parities can be distributed to each magnetic disk unit.

Embodiment 3.

Figure 6:
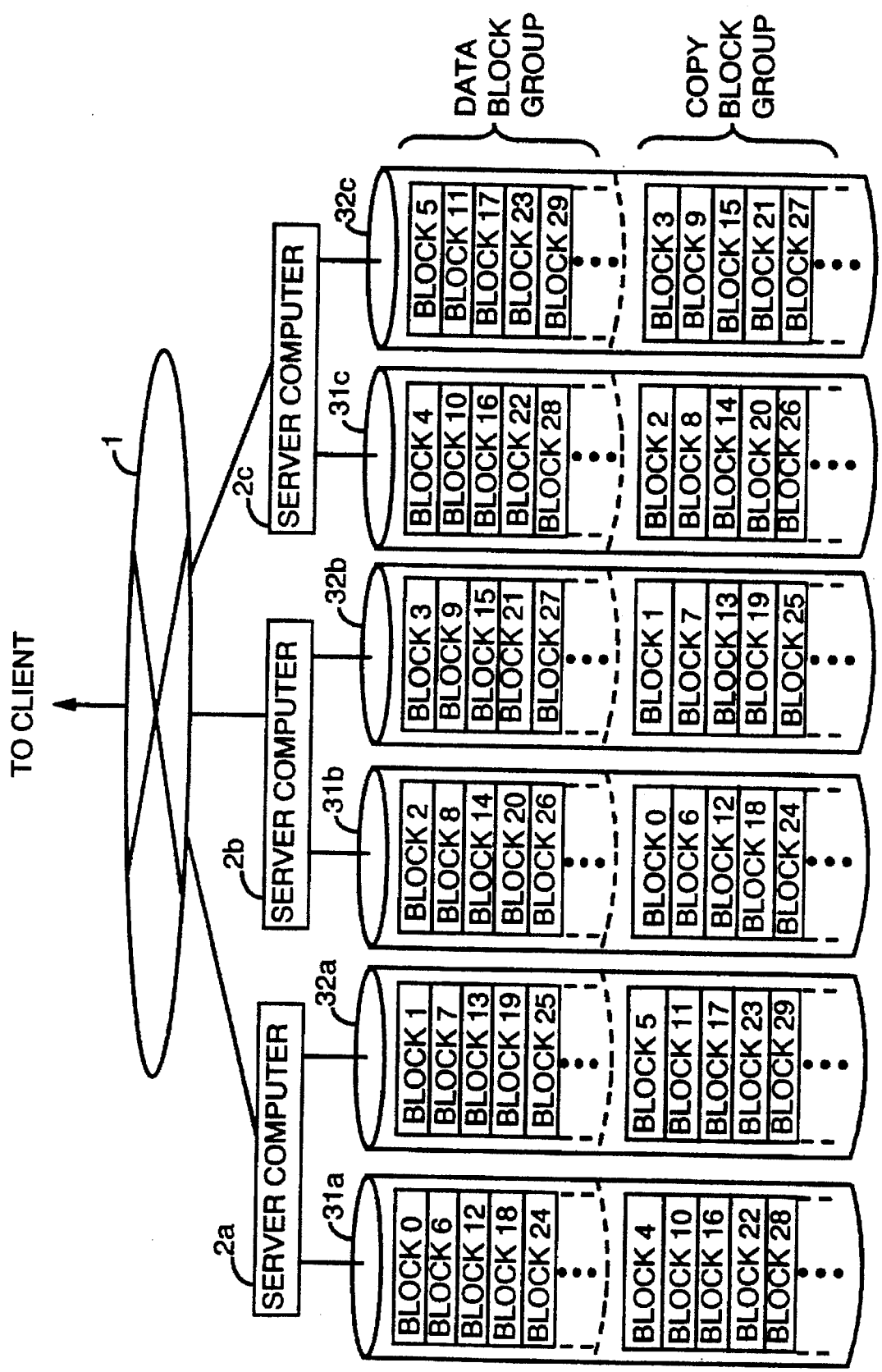
FIG. 6 shows a diagram illustrating how data is stored according to a third embodiment of the present invention.

FIG. 6 is a diagram showing an internal configuration of a server computer and how video program data is stored, according to the third embodiment. The third embodiment shown in FIG. 6 is different from the first embodiment as shown in FIG. 1 in the internal configuration of each server computer and how video program data is stored. The elements having the same reference numbers in FIG. 6 are the same portions or the corresponding portions in FIG. 1. Accordingly the detailed explanation of the same portions is omitted.

Each magnetic disk unit 31a, 32a, 31b, 32b, 31c and 32cc stores a group of data blocks and a group of copy blocks, where the corresponding block having the same number stores the same content of the data. As shown in FIG. 6, a starting position for striping the group of copy blocks is shifted by one server computer position, so that any server computer or any magnetic disk unit would not have the same contents between the copy block group and the data block group. The administration program 13 in the administration computer 12 stores and retains information on which server computer stores which copy blocks and how these copy blocks are stored. FIG. 7 is a table showing one example of the administration table which is stored and retained in the administration program 13. In this FIG. 7, information on such new elements as "with or without any fault server", "location of any fault server" and also "location of server having a copy" is added to the administration table shown in FIG. 3.

The administration program 13 informs the driver programs 7a~7d in the client computers of information on the "location of any fault server" and the "location of server having copy", in response to the access instruction from the client computer, when any one of the server computers has faulted. For example, if the server computer 2b becomes out of order and it becomes impossible to read out the data stored in the magnetic disk units 31b and 32b, the administration program 13 informs the driver programs 7a~7d that the fault server is 2b and the server which stores a copy is 2c. This is informed to the driver programs 7a~7d when they start to access the data. Instead of demanding the server computer 2b to read out the data, the driver program demands the server computer 2c to read out the corresponding copy block stored in the magnetic disk units 31c, 32c.

As described above, according to this third embodiment, the data are duplexed between the plurality of server computers and also the original data and its copy are separated so that each server computer does not have the original data and the copied data in the same server computer. This increases the reliability of the system because the data is read out from another server computer instead of reading out from the fault computer, if any one of magnetic disk units connected to each server computer becomes inaccessible due to brake down of the magnetic disk units or out of order of the server computer itself.

In FIG. 6, each magnetic disk units 31a, 32a, 31b, 32b, 31c and 32c is divided into two blocks, namely one for storing data blocks and the other for storing copy blocks. However a modification can be made so that only copy blocks are stored in another entirely different magnetic disk unit. Also any one of the server computers 2a~2c can have the function equivalent to the administration computer 12, instead of separate administration computer 12.

Embodiment 4.

Figure 8:
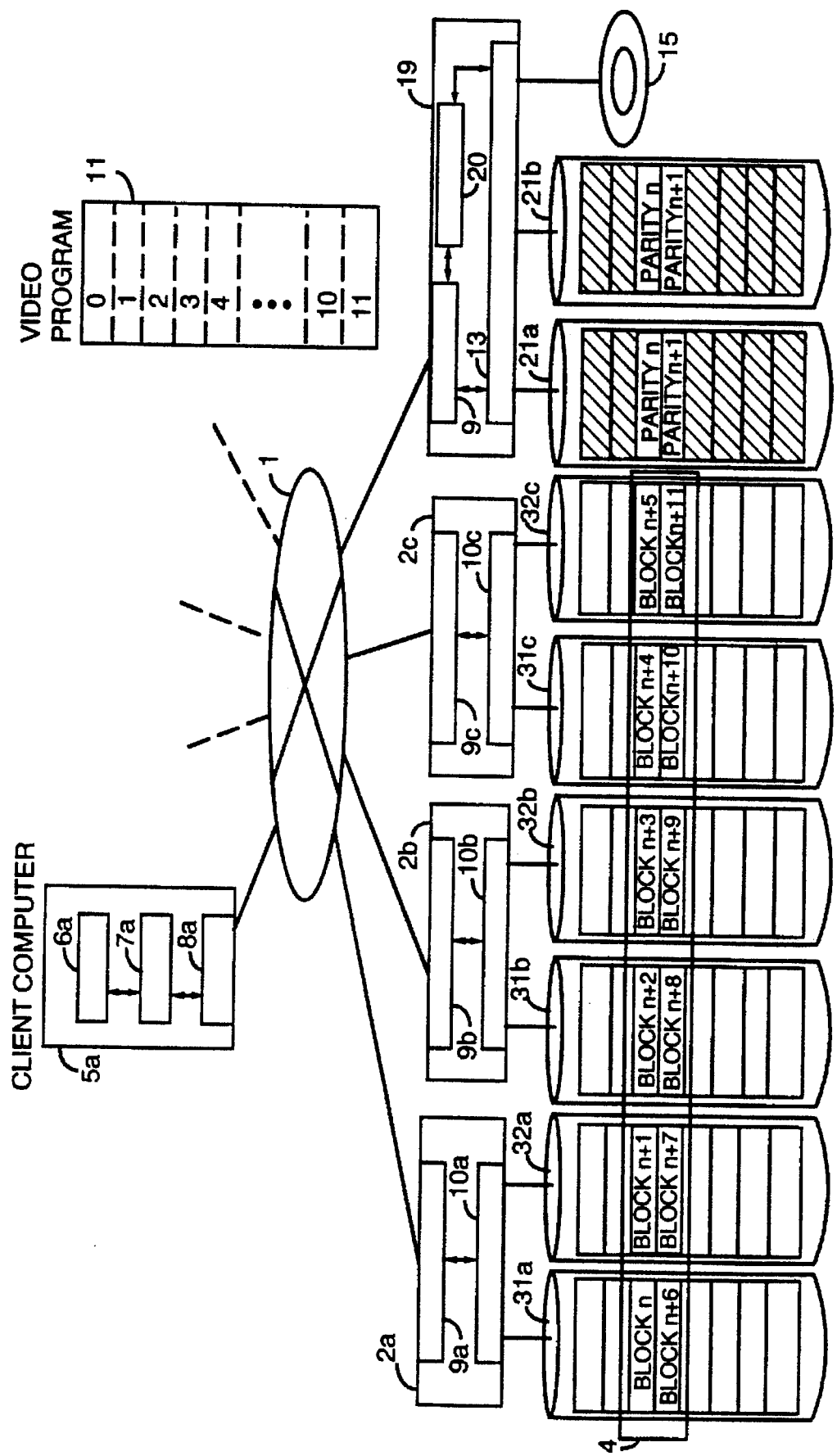
FIG. 8 shows a block diagram showing a construction of a client server system according to a fourth embodiment of the present invention.

FIG. 8 is a block diagram showing a configuration of client-server system according to the fourth embodiment. For the sake of simplification of the drawing, only two magnetic disk units are connected to each server computer in FIG. 8. The elements having the same reference numbers in the client server system in FIG. 8 are the same portions or the corresponding portions in FIG. 1. Accordingly the detailed explanation of the same portions is omitted.

Figure 9:
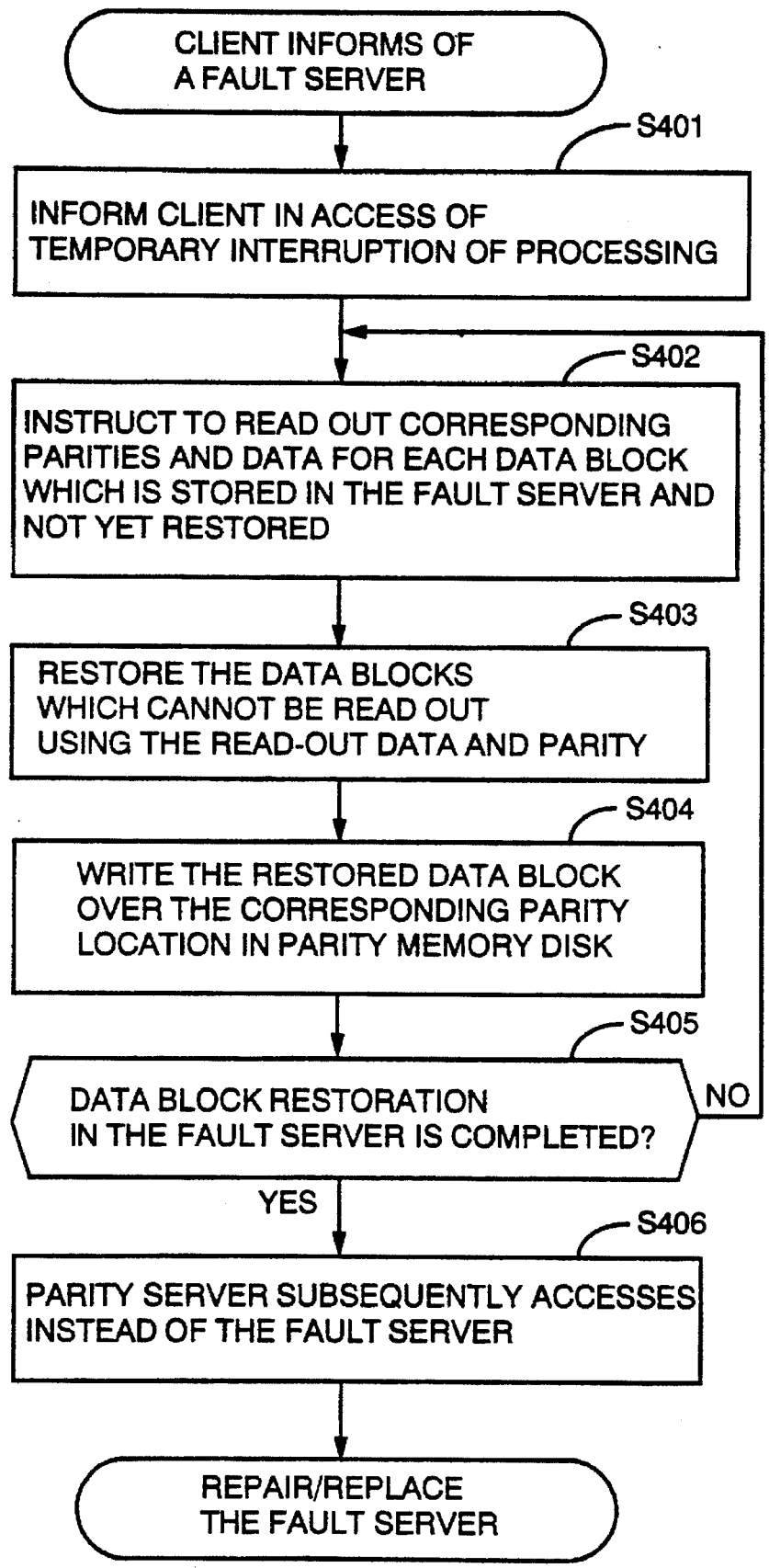
FIG. 9 shows a flow chart showing how a restoration process is carried out according to the fourth embodiment of the present invention.

The configuration of FIG. 8 comprises a server computer 19 which is privately used for storing parities and also has a function equivalent to the administration computer 12 in the first embodiment. Since this private parity server computer 19 operates as an administration computer, it comprises the administration program 13 for administrating a video program, the large capacity storage 15 for storing the original video program 11 as discussed in the first embodiment, and the server-side network interface 9 instead of the administration computer-side network interface 14. Also, the configuration of FIG. 8 comprises a inter-server disk unit array administration means 20 which operates on the private parity server computer 19, and have a function as an inter-server parity generation means for generating parities as well as a function as an inter-server restoration means for restoring data when one of the magnetic disk units 31a, 32a is inaccessible due to fault of the magnetic disk units 31a, 32a or due to out of order of any one of the server computers. Further, the configuration of FIG. 8 comprises magnetic disk units 21a, 21b for storing parities which correspond to the data stored in the magnetic disk units 31a, 32a, 31b, 32b, 31c and 32c. The intra-server disk unit array administration means 20 generates parities by calculating it from the following equation, and stores the generated parities in the parity magnetic disk units 21a, 21b, and reads out the stored parities in the parity magnetic disk units 21a, 21b.

parity $p$=block $n$ (+) block $n+2$ (+) block $n+4$ parity $q$=block $n+1$ (+) block $n+3$ (+) block $n+5$ parity $p+1$=block $n+6$ (+) block $n+8$ (+) block $n+10$ parity $q+1$=block $n+7$ (+) block $n+9$ (+) block $n+11$ FIG. 9 is a flow chart showing steps of data restoration in according to the fourth embodiment. The following is an explanation on the procedure when the server computer 2b has faulted, with reference to FIG. 9.

Step 1: When the client computer 5a finds any fault in the server computer 2b, for example, it fails to connect to the server 2b or it fails to read out data from the server 2b, the client computer informs the inter-server disk unit array means 20 in the private parity server computer 19 that the server computer 2b is out of order.

Step 2: The inter-server disk unit array administration means 20 then instructs all the client computers in access to stop accessing the video program and starts data restoration. The administration program 13 informs a client computer not to access the server computer 2b when the client computer forwards an access demand to the video program by notifying that any access to the video program is stopped to distribute due to server fault (S 401).

Step 3: The inter-server disk unit array administration means 20 then reads out the parity block p which corresponds to the data block n+2, while the inter-server disk unit array administration means 20 simultaneously demands the server computers 2a and 2c to read out the data blocks n and n+4 via the server-side network interface 9a and 9c (S 402).

Step 4: The inter-server disk unit array administration means 20 receives the data blocks n, n+4 and the parity block p to restore the data block n+2 which is stored in the fault server computer 2b by calculating it from the following equation (S 403).

block $n+2$=block $n$ (+) block $n+4$ (+) parity $p$

Step 5: The data block n+2 restored by the steps 3 and 4 is overwritten at the location of the parity p in the private parity magnetic disk unit 21a (S 404).

The above-mentioned steps 3~5 is repeated with respect to the remaining data blocks for every block (S 405) and all the data which are stored in the disk units 31b, 32b are finally restored and stored in the parity magnetic disk units 21a~21b. The data blocks n+3, n+8, n+9 are restored by calculating the following equation:

block $n+3$=block $n+1$ (+) block $n+5$ (+) parity $q$ block $n+8$=block $n+6$ (+) block $n+10$ (+)parity $p+1$ block $n+9$=block $n+7$ (+) block $n+11$ (+)parity $q+1$ Step 6: When data restoration is completed, the inter-server disk unit array administration means 20 informs the administration program 13 of the completion of restoration. At any occasion of inquiring information such as on the number of the server computers (S) when accessing to the video data is started, the client computer 5a informs the driver program 7a that the private parity server computer 19 retains the data in place of the fault server computer 2b. The driver program 7a then accesses to the private parity server computer 19 instead of accessing the server computer 2b, when it demands a necessary block (S 406).

According to this fourth embodiment, each data distributed and stored in a plurality of server computers has a corresponding parity. If any one of magnetic disk units connected to each server computer or a server computer itself becomes out of order, the inaccessible data is restored from the rest of the data and the parities.

Figure 10:
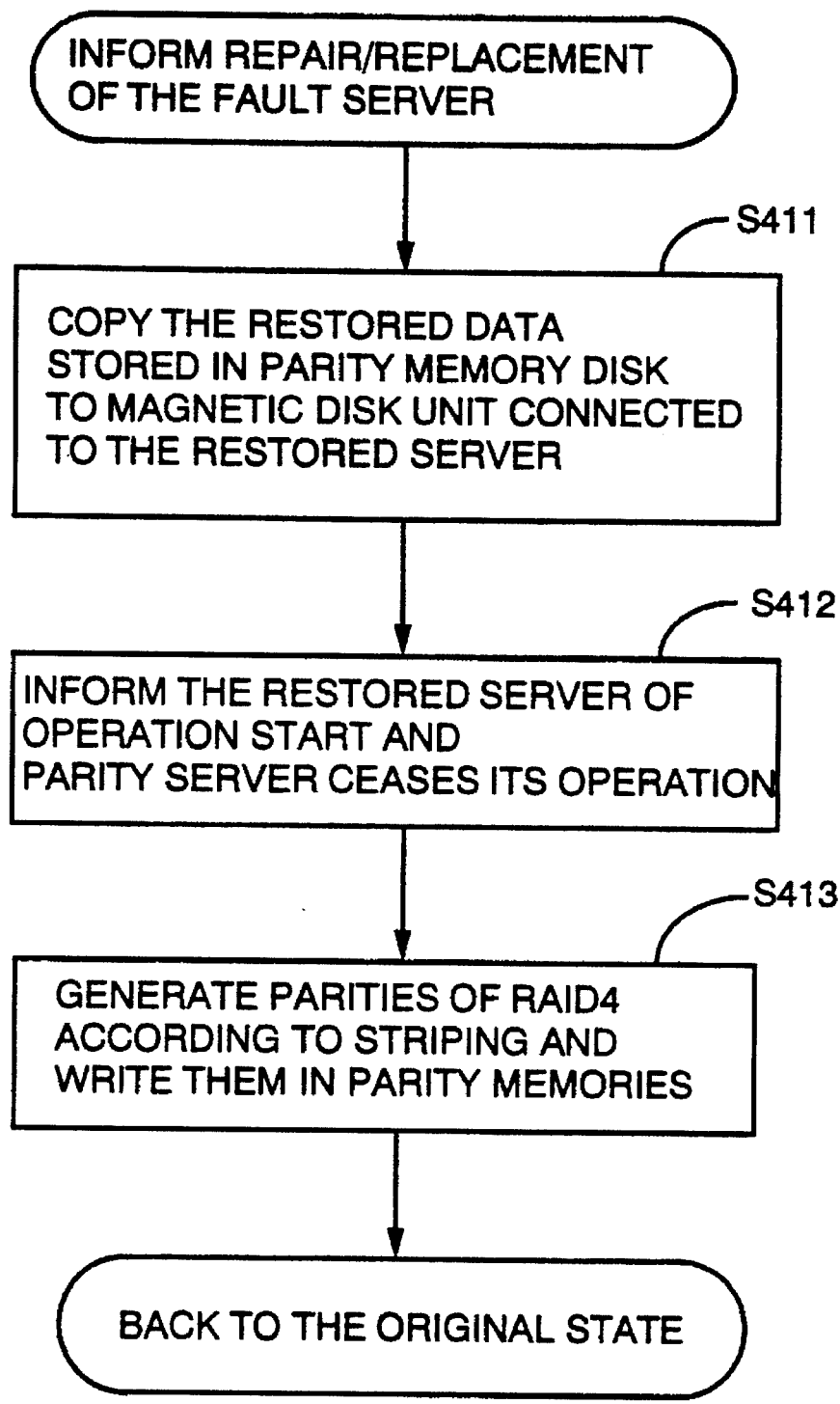
FIG. 10 shows a flow chart showing a process which is carried out after the restoration is completed according to the fourth embodiment of the present invention.

After the fault server computer was repaired or replaced, the fault server computer is recovered completely to the original state by the following steps. FIG. 10 is a flow chart showing the steps carried out after the restoration of the fault server.

The following is an explanation on these steps with reference to FIG. 10.

Step 1: A console and so on of the private parity server computer 19 informs that repair/replacement of the fault server computer is completed.

Step 2: The restored data stored in the parity magnetic disk units 21a, 21b is copied into the magnetic disk unit connected to the restored server computer 2b (S 411).

Step 3: The server computer 2b responds in the same manner as in the normal state for the demand from the client computer 5a (S 412), and the operation of the private parity server computer 19 is stopped. If any client computer is accessing to the restored data stored in the private parity server computer 19, the operation of the parity computer 19 continues until the operation of the client computer is completed.

Step 4: The parity computer 19 generates parities and stores them in the parity magnetic disk units 21a, 21b and goes back to the original state (S 413).

Embodiment 5.

Figure 11:
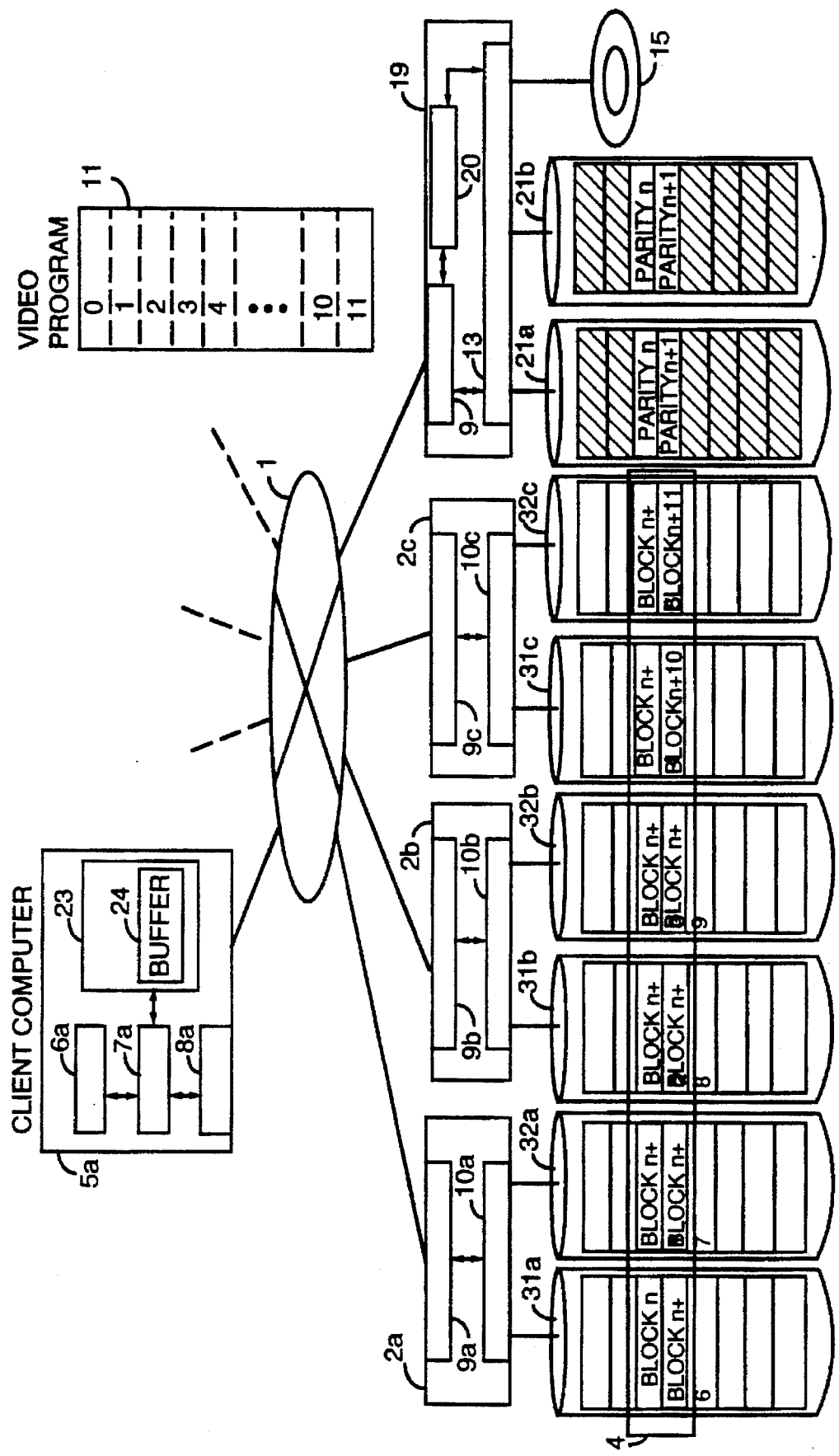
FIG. 11 shows a block diagram showing a construction of a client server system according to a fifth embodiment of the present invention.

FIG. 11 is a block diagram showing an configuration of a client-server system, according to the fifth embodiment. The fifth embodiment as shown in FIG. 11 is different from the fourth embodiment as shown in FIG. 8 in that the inter-server disk unit array administration means 20 in the private parity server computer 19 does not carry out data restoration, although it carries out generation of parities or read-out of parities. The fifth embodiment is also different from the fourth embodiment in that the client computer comprises data restoration means 23 and buffer 24. The rest of the part in this system of FIG. 11 is the same as that in FIG. 8. The elements having the same reference numbers in FIG. 11 are the same portions or the corresponding portions in FIG. 8. Accordingly the detailed explanation of the same portions is omitted.

The configuration of FIG. 11 comprises the data restoration means 23 for carrying out data restoration by instructing the private parity server computer 19 to read out parities when any one of magnetic disk units 31a, 32a, 31b, 32b, 31c and 32c or any one of server computers 2a~2c themselves has accidentally faulted which operates as well as a intra-dient restoration means 20 in FIG. 8, and buffer 24 for temporarily storing the data block read out for data restoration.

When an access to a series of video programs is started, the client computer 5a informs the administration program 13 in the private parity server computer 19, and receives information on the number (S) of the server computers, the number (D) of the magnetic disk units connected to each server computer, the number of the head block of the necessary video program, existence of any fault server, and the location of the fault server. The administration program 13 stores and retains an administration table as shown in FIG. 12 to respond back the above information to the client computer 5a. If all server computers operate normally, data is read out in the same steps as that of the first embodiment.

Figure 13:
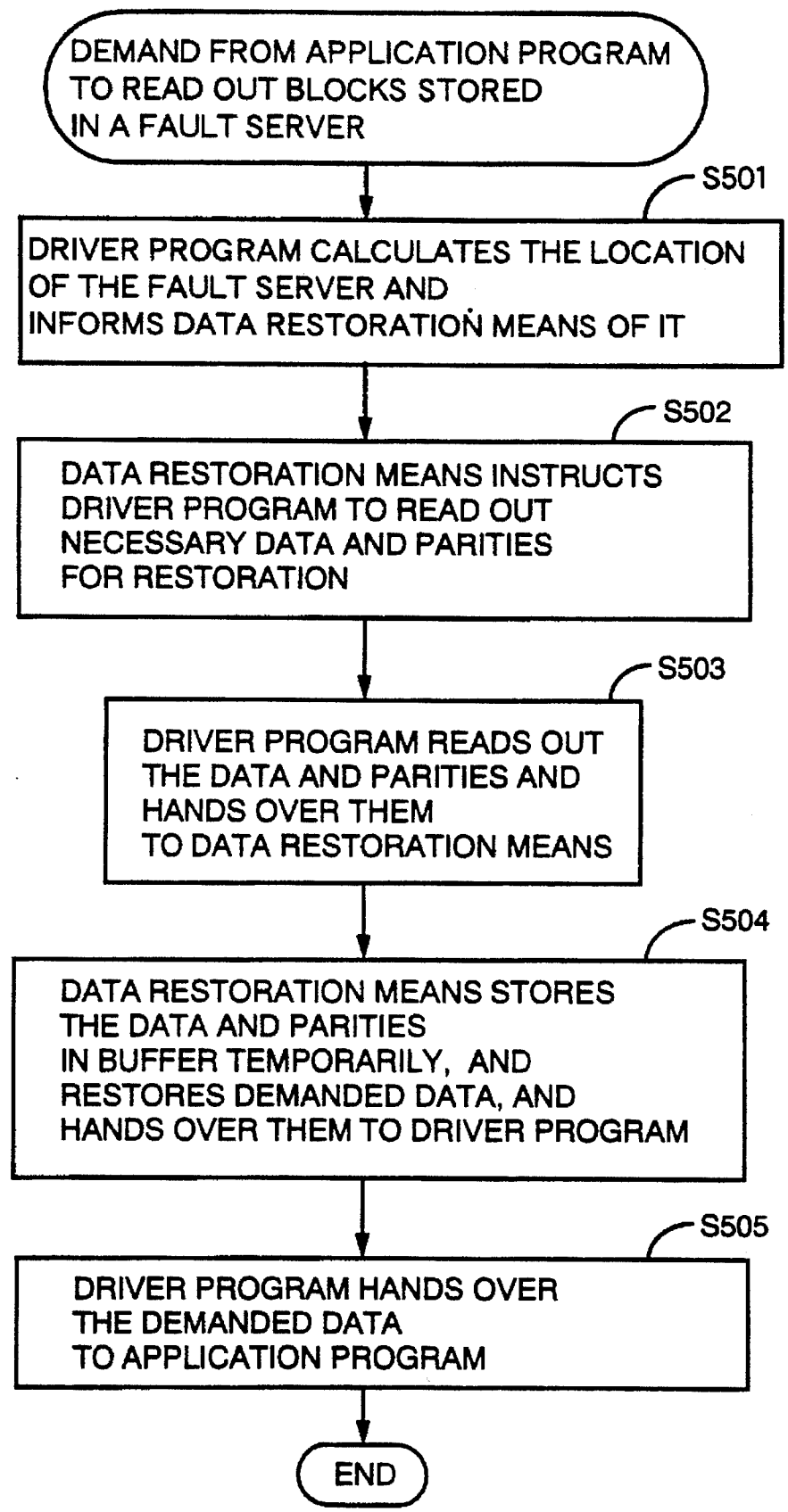
FIG. 13 shows a flow chart showing how a restoration process is carried out according to the fifth embodiment of the present invention.

When the server computer 2b has faulted, for example, the fault data of the server computer is handed over to the data restoration means 23. If the application program 6a demands to read out the data stored in the fault server computer 2b, the following steps are carried out. FIG. 13 is a flow chart showing a restoration process according to this fifth embodiment. The following steps are explained with reference to FIG. 13 in case of reading out the block n+2 as an example.

Step 1: The application program 6a demands the driver program 7a to read out block n+2.

Step 2: The driver program 7a calculates the location of the server which stores each block in the same way as discussed in the first embodiment and informs the data restoration means 23 that the block n+2 which is stored in the fault server computer is demand to be read out (S 501).

Step 3: The data restoration means 23 instructs the driver program 7a to read out the block n, the block n+4 and the parity p, instead of block n+2. If the blocks n and n+4 already exist in the buffer 24, it does not instruct the driver program 7a to read out them (S 502).

Step 4: The driver program 7a sequentially switches the server computers 2a, 2c and the private parity server computer 19 in order to read out the block n, the block n+4 and the parity p (S 503). The driver program 7a hands over the read data to the data restoration means 23.

Step 5: The data restoration means 23 temporarily stores each block in the buffer 24 and restores the data block n+2 which is stored in the fault server computer 2b according to the data and the parities read out. The restored data block is then handed over to the driver program 7a (S 504).

Step 6: The driver program 7a then hands over the data block n+2 in demand to the application program 6a.

Since a video program is usually read out sequentially, the block n should have been already read out when the application program 6a demands reading out of the block n+2. If the block n which has been already read out is temporarily stored in the buffer 24 beforehand, the above step 3 in which the block n is read out can be skipped. After the block n+2 has been read out, the block n+4 should be demanded next to be read out. If the block n+4, which is read out for restoring the block n+2, is stored temporarily in the buffer 24, the data of the block n+2 can be obtained from the buffer 24 without accessing the server computers, when there comes a demand again to read out the block n+4. In other words, even if one of the server computers has faulted, neither the load of the other server computers changes nor the amount of transfer on the network increases. The load on the client computer only increases in Exclusive OR arithmetic for restoring data, which is not a heavy load for a CPU having excellent performance of recent years. This is a great advantages because the performance of the whole system is not deteriorated even when fault occurs.

According to this fifth embodiment, since the data restoration means 23 and the buffer 24 are comprised inside a client computer, the client computers themselves can restore the data stored in the fault server, if any one of the magnetic disk units connected to each server computer or a server computer itself becomes out of order.

Embodiment 6.

According to the fourth embodiment, distribution of any video program is stopped in case of fault of a server computer, and data restoration is carried out by the parity server computer. According to the fifth embodiment, distribution of a video program is not stopped even in case of fault of a server computer, and each client computer carries out data restoration by itself. However in this case, the result of this restoration is not reflected on the server computers. According to the sixth embodiment, distribution of a video program is continued, while it allows a client computer to access the data even if the private parity server computer is carrying out data restoration.

Figure 14:
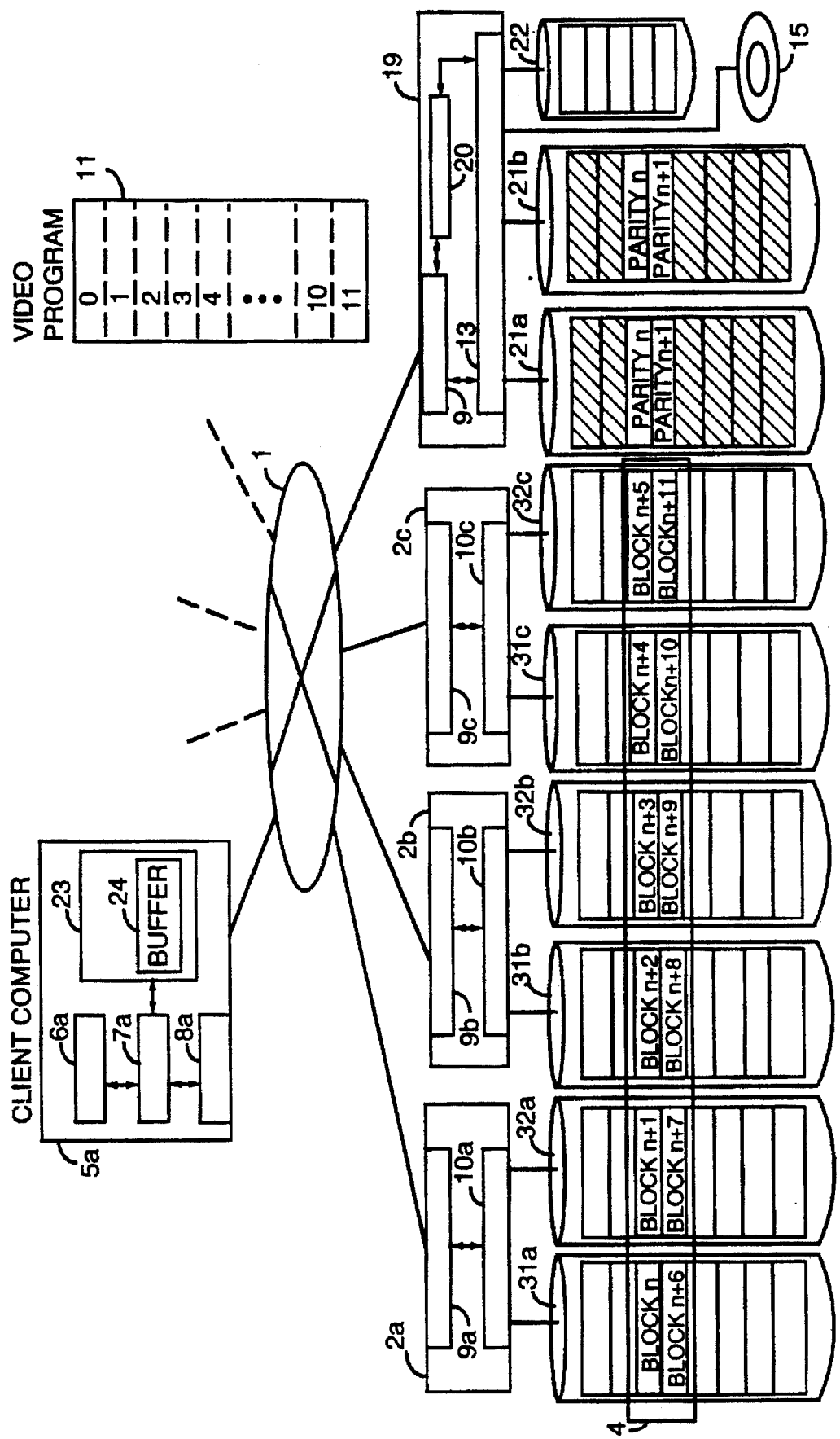
FIG. 14 shows a block diagram showing a construction of a client server system according to a sixth embodiment of the present invention.

FIG. 14 is a block diagram showing a construction of the client-server system. The elements having the same reference numbers in FIG. 14 are the same portions or the corresponding portions in FIG. 8 and FIG. 14. Accordingly the detailed explanation of the same portions is omitted. In this sixth embodiment, an inter-server disk unit array administration means 20 which is similar to that of the fourth embodiment in FIG. 8 is arranged inside the private parity server computer 19, and the data restoration means 23 and the buffer 24 which are similar to those of the fifth embodiment in FIG. 11 are also arranged inside the client computer 5a.

The configuration of FIG. 14 comprises standby disk unit 22 for storing parties therein. The capacity of the standby disk unit 22 has nothing to do with the number of the magnetic disk units connected to each server computer. Rather, the capacity of the standby disk unit 22 is enough if there is a room to store all parity blocks which is related to a single video program.

When a client computer detects any fault in the server computers and informs the private parity server computer 19 of it, the inter-server disk unit array administration means 20 starts data restoration for every video program unit. On this occasion, an access from the client computer is not restrained. In this embodiment, the administration program 13 stores and retains an administration table as shown in FIG. 12. In this administration table, there is a status column which indicates states of the fault video which manages the status of all video programs stored in the administration program 13 as shown in FIG. 12. There are four kinds of status, that is, "normal", "not-yet-restored", "during restoration" and "already restored". If there is no fault in all of the server computers, the status will be set "normal".

Figure 15:
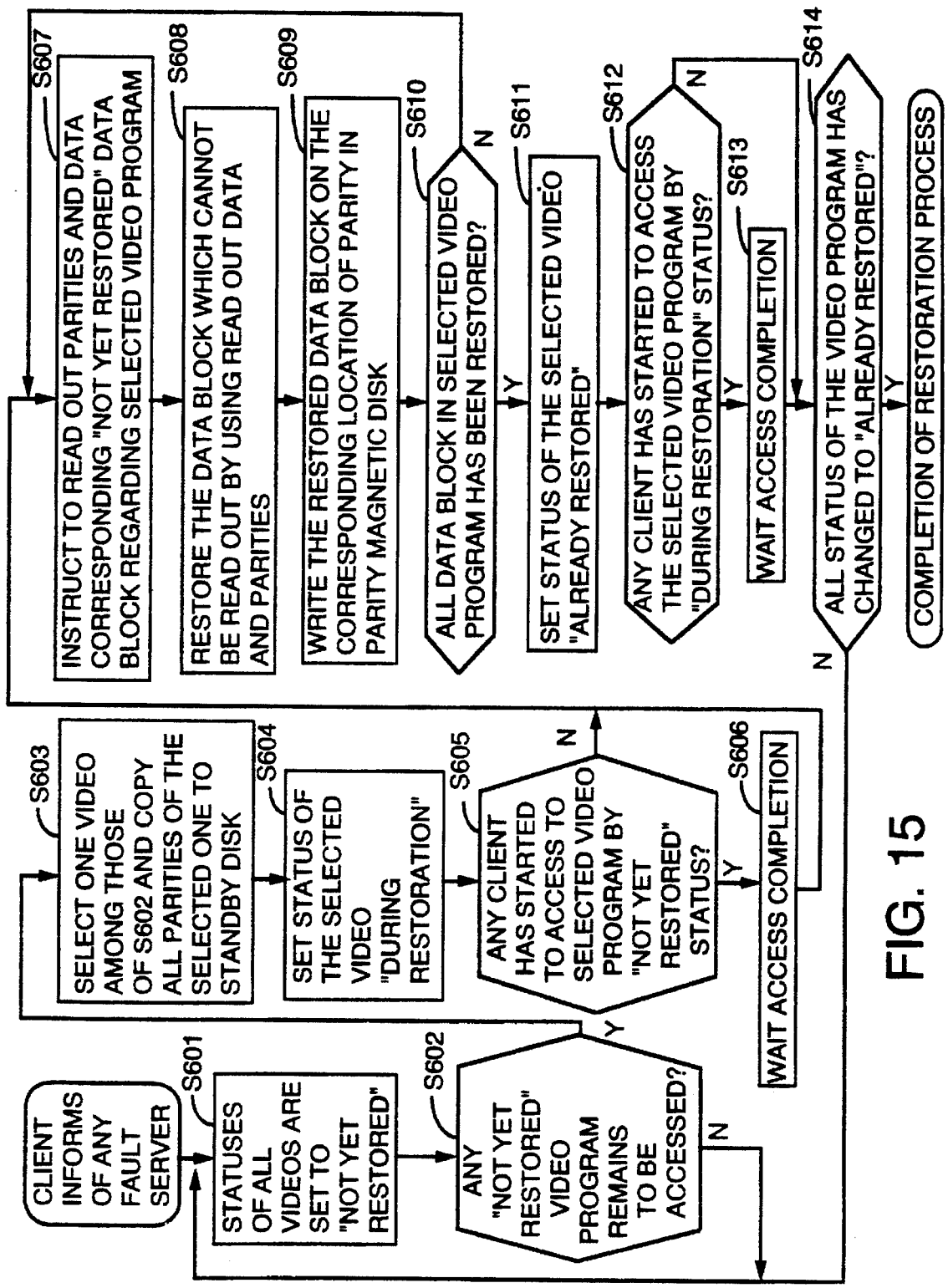
FIG. 15 shows a flow chart showing how a restoration process is carried out according to the sixth embodiment of the present invention.

FIG. 15 is a flow chart showing data restoration steps which are carried out by the inter-server disk unit array administration means 20. The following is an explanation on the steps of restoration with reference to this flow chart of FIG. 15.

Step 1: When the inter-server disk unit array administration means 20 is informed of any fault of a server computer from the client computer, it sets all status of the video programs "not-yet restored" (S 601).

Step 2: A video program, whose status is "not-yet restored" and is not currently accessed, is selected with reference to the column of "client in access" in the administration table of FIG. 12, and all parities related to the selected video program is copied on the standby disk unit 22 (S 602, S 603). If there is no such idle program, the inter-server disk unit array administration means 20 wait waits until this client computer completes the accessing.

Step 3: The status of the selected video program is set "during restoration" (S 604). If there is any client server whose status is set "not-yet restored" and which begins to access this video program, the inter-server disk unit array administration means 20 waits until this client computer completes the accessing (S 605,S 606).

Step 4: The inter-server disk unit array administration means 20 instructs so that the corresponding data and parities are read out for every data block unit which remains unrestored in the selected video program (S 607).

Step 5: The inter-server disk unit array administration means 20 restores the inaccessible data according to the data and the parities which are read out (S 608).

Step 6: The inter-server disk unit array administration means 20 write the restored data blocks at the corresponding location of the parities stored in the parity magnetic disk units 21a, 21b (S 609).

Step 7: The above steps 4~6 are repeated until all data blocks in the selected video program are completely restored (S 610).

Step 8: When data restoration of the selected video program is completed, the status is set to "already restored" (S 611).

If there is any client server whose status is set "during restoration" and which begins to access this video program, the inter-server disk unit array administration means 20 waits until this client computer completes the accessing (S 612,S 613).

Step 9: If there is any "not-yet restored" video program, the procedure goes back to the step 2. When all status of the video programs is set "already restored", the restoration process is completed (S 614).

When the fault server computer has been repaired or replaced by another normal server computer, the copies and parities of the restored data is regenerated and the status returns to the original state according to the flow chart of FIG. 10. When the original condition is completely restored, all statuses of the video programs are set "normal".

The following is an explanation on the access by a client computer. When the client computer starts access to a certain video program, the client computer informs the administration program 13 of an access start and receives information on the number (S) of the present server computers, the number (D) of the magnetic disk units, existence of any fault server, the location of the fault server, the numbering of the head block of the video program, and the status of the video program. Then, the access is carried out in the following manner according to its status.

"normal": access is carried out in accordance with the process described in the first embodiment.

"not-yet restored": access is carried out in accordance with the process described in the fifth embodiment. However, reading out of the parities is carried out by the parity magnetic disk units 21a, 21b.

"during restoration": access is carried out in accordance with the process described in the fifth embodiment. However, reading out of the parities is carried out by the standby disk unit 22.

"already restored": access is carried out in accordance with the manner described in the first embodiment. However, accessing to the data blocks which are stored in the fault server computer is carried out in accordance with the step 6 of the fourth embodiment. In other words, the private parity server computer 19 is accessed, and the private parity server computer 19 reads out the restored data blocks which have been already stored in the parity magnetic disk units 21a, 21b.

As described above, according to the sixth embodiment, a necessary data is obtained without ceasing the procedures of the client computer even when any magnetic disk unit or server computer becomes out of order. Furthermore, the fault server computer is repaired/replaced by another normal server computer to the original status before the fault is occurred without ceasing the procedures of the client computer.

Embodiment 7.

According to any one of the embodiments 4~6, it is described that the private parity server computer 19 also has a function equivalent to the administration computer 12 which is described in the first embodiment. However, it is possible that the private parity server computer 19 is separated from the administration computer 12.

Embodiment 8.

Figure 16:
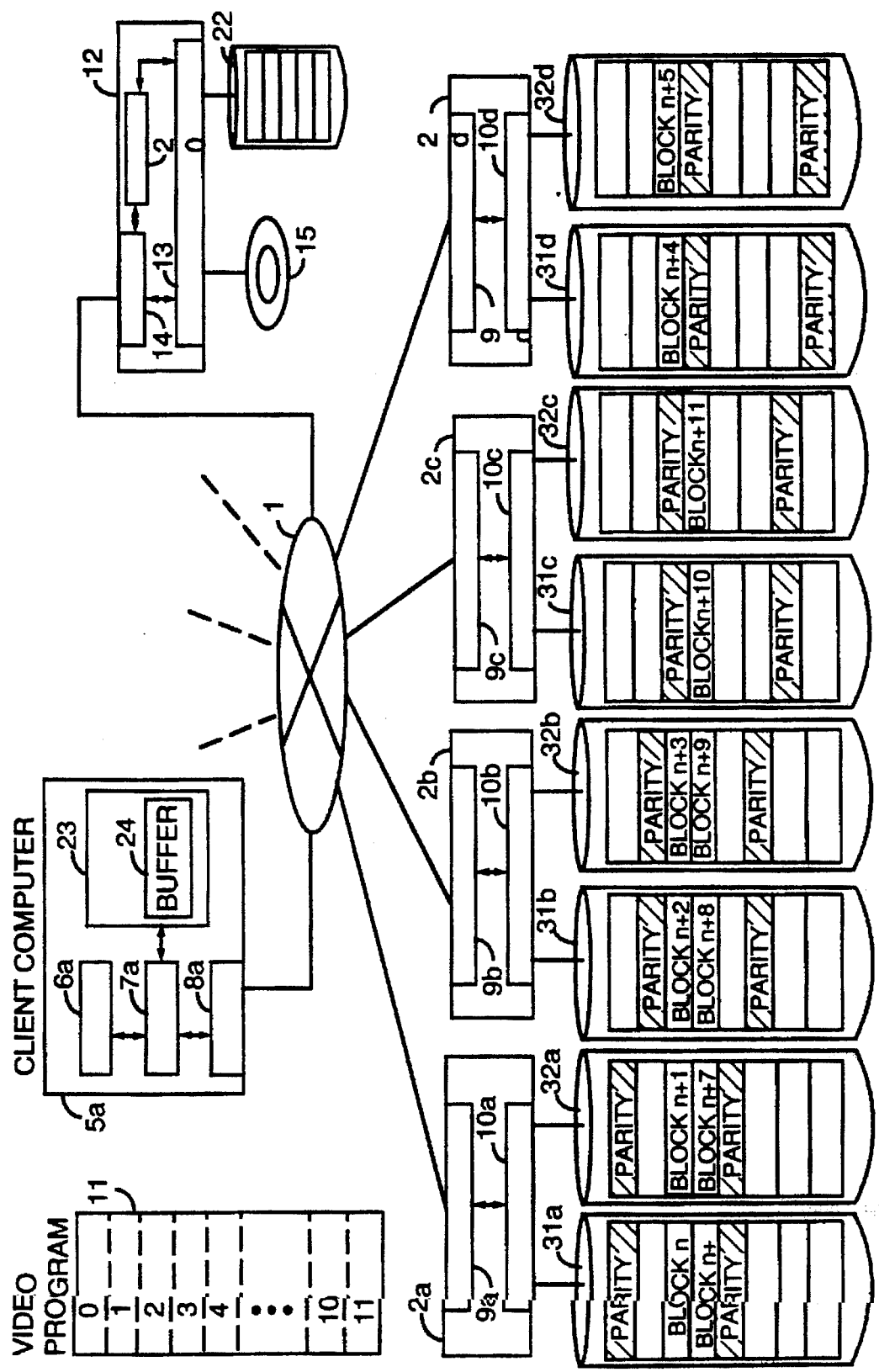
FIG. 16 shows a block diagram showing a construction of a client server system according to an eighth embodiment of the present invention.

According to the fourth embodiment, it is described that whole parities are stored in the private parity magnetic disk unit 21a, 21b, using the private parity server computer 19. However, it is easy to realize the system in which the parities are distributed and stored over the magnetic disk units connected to each server computer. FIG. 16. is a block diagram of such client-server system. The following calculation enables the client computer to specify the server computer, even if the data and the parity are distributed in the magnetic disk units connected to the different server computer. The location xp of the server computer which stores the parity corresponding to an arbitrary data block N is obtained in the following equation:

$$xp=\{int[N/(D \cdot (S-1))]\}\% \ S+1$$

where, S is a number of server computers, and D is a number of magnetic disk units connected to each server computer.

The location x of the server computer which stores the arbitrary data block N is obtained in the following equation:

$$x=int\{[N \ \% \ [D \cdot (S-1)]/D]\}+1$$

where, in case of x≧xp, the value of x is added by 1 such as x+1.

In the above equations, "int" represents an integer part and "%" represents a remainder.

Embodiment 9.

According to any one of the embodiments 1~8, a video data is taken as an example. However the data which are handled in the system is not limited to a video data but also applied to animations, static images, music, sounds or texts and so on.

Embodiment 10.

According to the embodiments 4~6, when any one of the plurality of the magnetic disk units connected to server computers as well as the server computers themselves break down, the normal magnetic disk unit which can access the server computer as well as the fault magnetic disk unit is also restored. In this tenth embodiment, it concerns the system where only the magnetic disk unit faults and the server computer does not fault. Accordingly, the data stored in the fault magnetic disk unit is the only one to be restored in the present tenth embodiment.

Figure 17:
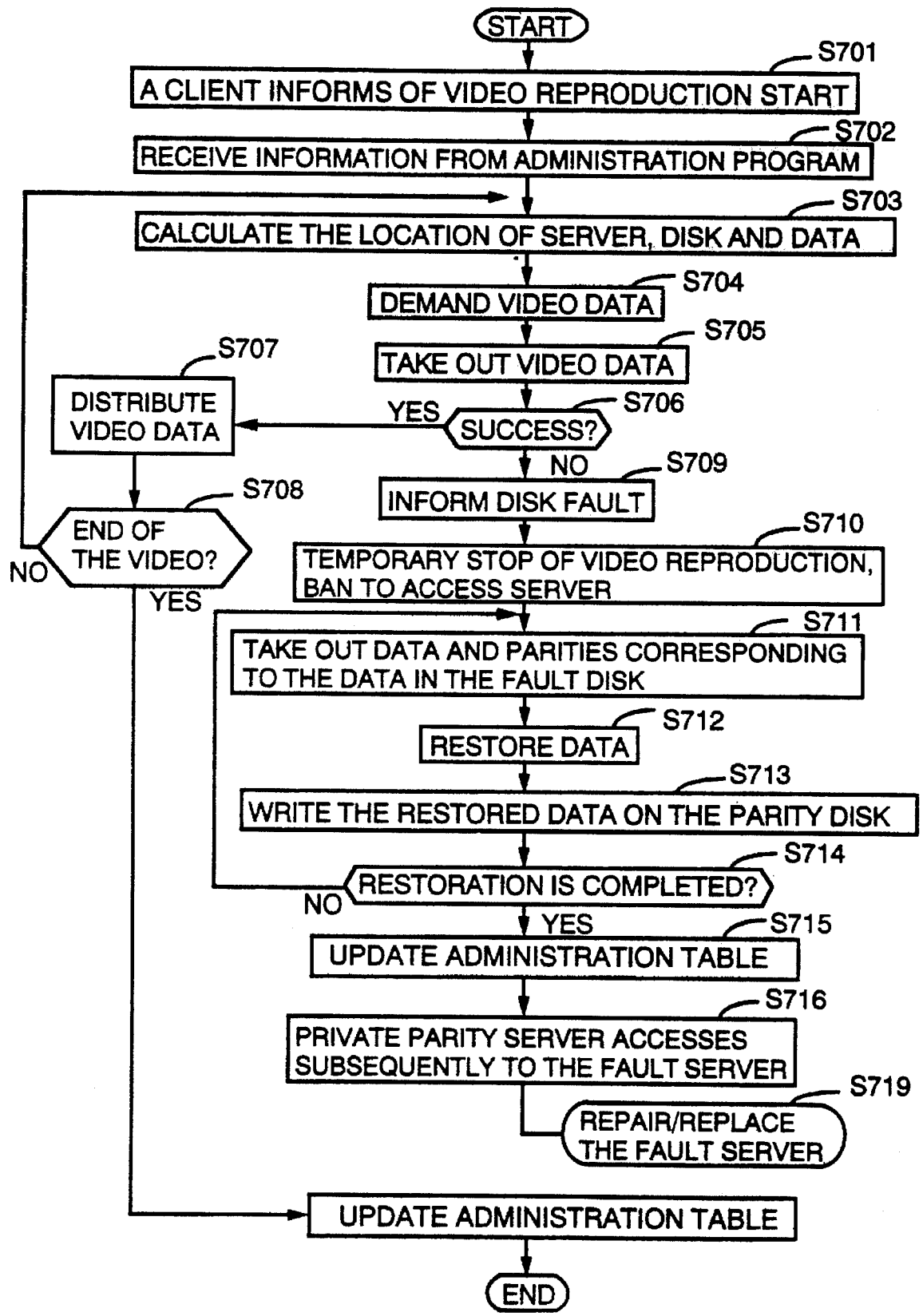
FIG. 17 shows a flow chart showing how a video program is read out according to a tenth embodiment of the present invention.

The following is an explanation of an operation to read out a video program with reference to a flow chart of FIG. 17, when the magnetic disk unit 31b faults.

Step 1: When starting video reproduction, the client computer 5a informs the administration program 13 in the private parity server computer 19 of the start of video reproduction (S 701).

Step 2: The administration program 13 makes a modification on the administration table such that the video reproduction is started by the client computer 5a, and hands over information on the number of server computers, the number of disk units and existence of any fault disk unit to the client computer 5a (S 702). At this moment, it is supposed that there is no fault disk unit.

Step 3: The client computer 5a calculates the locations of the server computer 2a, the magnetic disk unit 31a and the data in the magnetic disk unit 31a using the method of calculations (a)~(c) of the first embodiment to decide from which server and a magnetic disk unit the block n is read out (S 703). The client computer 5a hands over the information on the location of the magnetic disk unit 31a and the location of data in the magnetic disk unit 31a to the server computer 2a, and instructs the server computer 2a to read out the block n (S 704).

Step 4: The server computer 2a reads out the data in accordance with information from the client (S 705, S 706) and sends them to the client computer 5a (S 707).

Step 5: Since all data has not yet been read out (S 708) at this stage, the procedure goes back to step 3. As for the block n+1, the steps 3, 4 are repeated in the same manner as discussed above to read out the data. When the data is completely read out, the administration program 13 makes a modification on the administration table such that the video reproduction is completed by the client computer 5a (S 719).

Step 6: The client computer 5a demands the server computer 2b to get the block n+2 in the same manner as step 3 (S 703, S 704). The server computer 2b tries to read out the block n+2 from the magnetic disk unit 31b, but it fails in reading out it because the magnetic disk unit 31b has faulted (S 705, S 706).

Step 7: The server computer 2b informs the client computer 5a that the disk unit 31b faults. The client computer 5a then informs the disk unit array administration means 20 in the private parity server computer 19 that the disk unit 31b which is connected to the server computer 2b faults (S 709).

Step 8: The inter-server disk unit array administration means 20 informs all client computers which are accessing to a video program via server-side network interface 9 that distribution of video programs is stopped, and then it starts restoration procedure of the data stored in the magnetic disk unit 31b. During the data restoration, if a client informs of a start to access to the video programs, the administration program 13 informs the client that the distribution of the video programs is now stopped due to the fault of the disk unit so that each server computer is prohibited to access the server computer (S 710). Step 9: The inter-server disk unit array administration means 20 starts to read out the parity block p which corresponds to the data block n+2, while it instructs the server computers 2a, 2c via the server-side network interfaces 9a and 9c to read out the data blocks n and n+4, which are the data blocks having the same redundancy group corresponding to the data block n+2 (S 712).

Since the locations of the disk unit, the data and the parity where the data blocks n and n+4 are stored are the same as those of the data block n+2, if information of the data blocks n and n+4 is forwarded to the server computers 2a and 2c, the demanded block as same as the data block n+2 cam be obtained.

Step 10: When the inter-server disk unit array administration means 20 receives the data blocks n, n+4 and the parity block p, the data block n+2 stored in the fault magnetic disk unit 31b can be restored by the following calculation (S 712):

block n+2=block n (+) block n+4 (+) parity p

Step 11: The data block n+2 which has been restored in the step 10 is written over the parity p in the private parity magnetic disk unit 21a (S 713). In this case, the locations of the parity and the data is the same as those of the block n+2.

The steps 9–11 are repeated by a block unit with regard to the rest of the data blocks which are stored in the magnetic disk unit 31b until the restoration is completed for all data blocks in the magnetic disk unit 31b (S 714). Finally, all the data which are stored in the magnetic disk unit 31b is restored in the private parity magnetic disk unit 21a.

The data block n+8 in the magnetic disk unit 31b is restored by the following calculation:

block n+8=block n+6 (+) block n+10 (+) parity p+1

Step 12: When the data restoration is completed, the inter-server disk unit array administration means 20 informs the administration program 13 of the completion of the restoration. The administration program 13 writes information of the fault of the magnetic disk unit 31b on the administration table (S 715).

The client computer 5a subsequently informs the driver program 7a that the private parity magnetic disk unit 21a in the private parity server computer 19 has the data in place for the fault magnetic disk unit 31b of the server computer 2b, when starting an access to the video program. The driver program 7a demands the private parity server computer 19 to read out of the necessary data blocks instead of reading out the blocks stored in the fault magnetic disk unit 31b of the server computer 2b (S 716).

Figure 18:
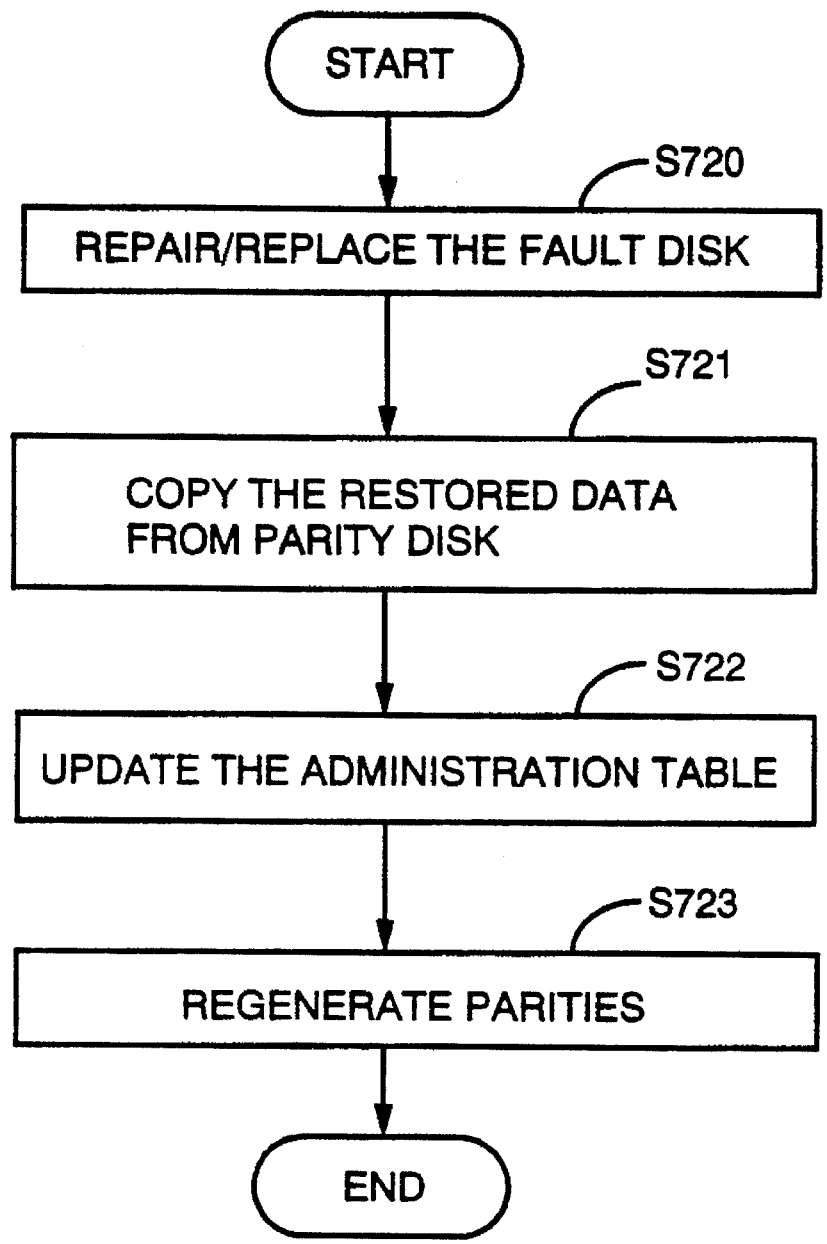
FIG. 18 shows a flow chart showing a process which is carried out after the restoration is completed according to the tenth embodiment of the present invention.

After the fault disk unit is repaired or replaced by another normal disk unit, the system completely goes back to the original state by the following steps. The procedures are explained using FIG. 18.

Step 1: The completion of repair/replacement by another fault disk unit is informed from a console and so on of the private parity server computer 19 (S 720).

Step 2: The inter-server disk unit array administration means 20 copies the restored data which are stored in the private parity magnetic disk unit 21a to a new magnetic disk unit (S 721). The administration program 13 is then informed of the completion of copy after the copy is completed. The administration program 13 clears out the fault server-disk unit column in the administration table (S 722).

The inter-server disk unit array administration means 20 responds to the demand from the client computer 5a in the same manner as that of the normal operation, and data distribution from the private parity server computer 19 is ceased. However, if there is any client computer which is accessing to the video programs using the restored data which are stored in the private parity server computer 19, the private parity server computer 19 continues to distribute the data until the client computer has completed its access to the private parity server computer 19.

Step 3: When the inter-server disk unit array administration means 20 confirms that there is no client which is accessing the private parity magnetic disk unit 21a, the inter-server disk unit array administration means 20 regenerates the parities and stores them in the private parity magnetic disk unit 21a. Then the procedure status goes back to the original status (S 723).

As described above, according to this embodiment, since the inter-server disk unit array administration means 20 only restores the data which are stored in the fault magnetic disk unit 31b into the private parity magnetic disk unit 21a, the time required for the restoration is shortened because it is only necessary to restore the data which are stored in the single fault disk unit. This is advantageous in that more the magnetic disk units are connected to a single server computer, the more the restoration time can be shortened.

Assume that the three fault disk units are connected to respective three fault server computer.

According to the fourth embodiment, if one magnetic disk units faults, the number of the disk units which are normally accessible during a degeneracy state is six, because the fault disk unit is processed as the same way as the fault server computer.

However according to this tenth embodiment, since only one of the fault disk unit is restored, the other 8 disk units other than the fault one remain accessible. This brings the effect to prevent deterioration of the capacity of the system to distribute the data during the degeneracy state.

The operation same as this tenth embodiment is also applicable to the interserver disk unit array administration means 20 of the embodiments 4 and 6.

Embodiment 11.

According to the embodiments mentioned so far, an administration computer is personally used or the server computers have a function of the administration computer. In this eleventh embodiment, the function of an administration computer is given to a client.

Figure 19:
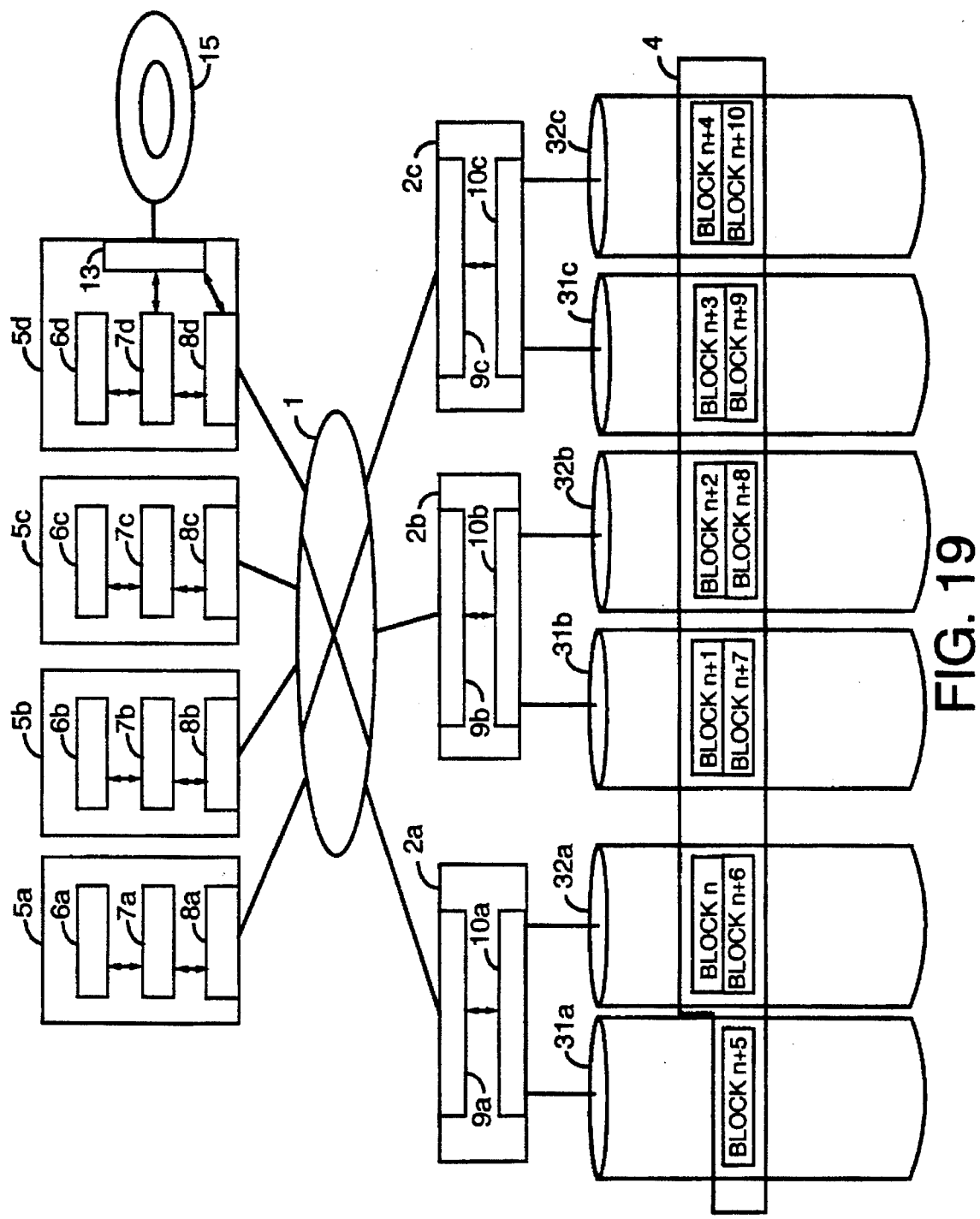
FIG. 19 shows a block diagram showing a construction of a client-server system according to an eleventh embodiment of the present invention.

In FIG. 1, the administration computer 12 comprises an administration program 13, an administration computer-side network interface 14 and a large capacity storage 15 which is connected to the administration computer 12. However in FIG. 19 of the present embodiment, an administration program 13 is arranged inside the client computer 5d, and interfaces with the driver program 7d and the client-side network interface 8d. The client computer 5d is connected to a large capacity storage 15 in order to operate as an administration computer 12. In this case, each client computer specifies an administration computer by designating the client computer 5d.

A plurality of client computers can have a function equivalent to such administration computer. If there are a plurality of administration computers, each client computer designates a plurality of the client computers which have a function equivalent to the administration computer. If there is a plurality of such designations, the first designated one is used as an administration computer. The next designated computers in the rest of the designated computers are used sequentially, when the server designated as an administration computer faults.

Figure 20:
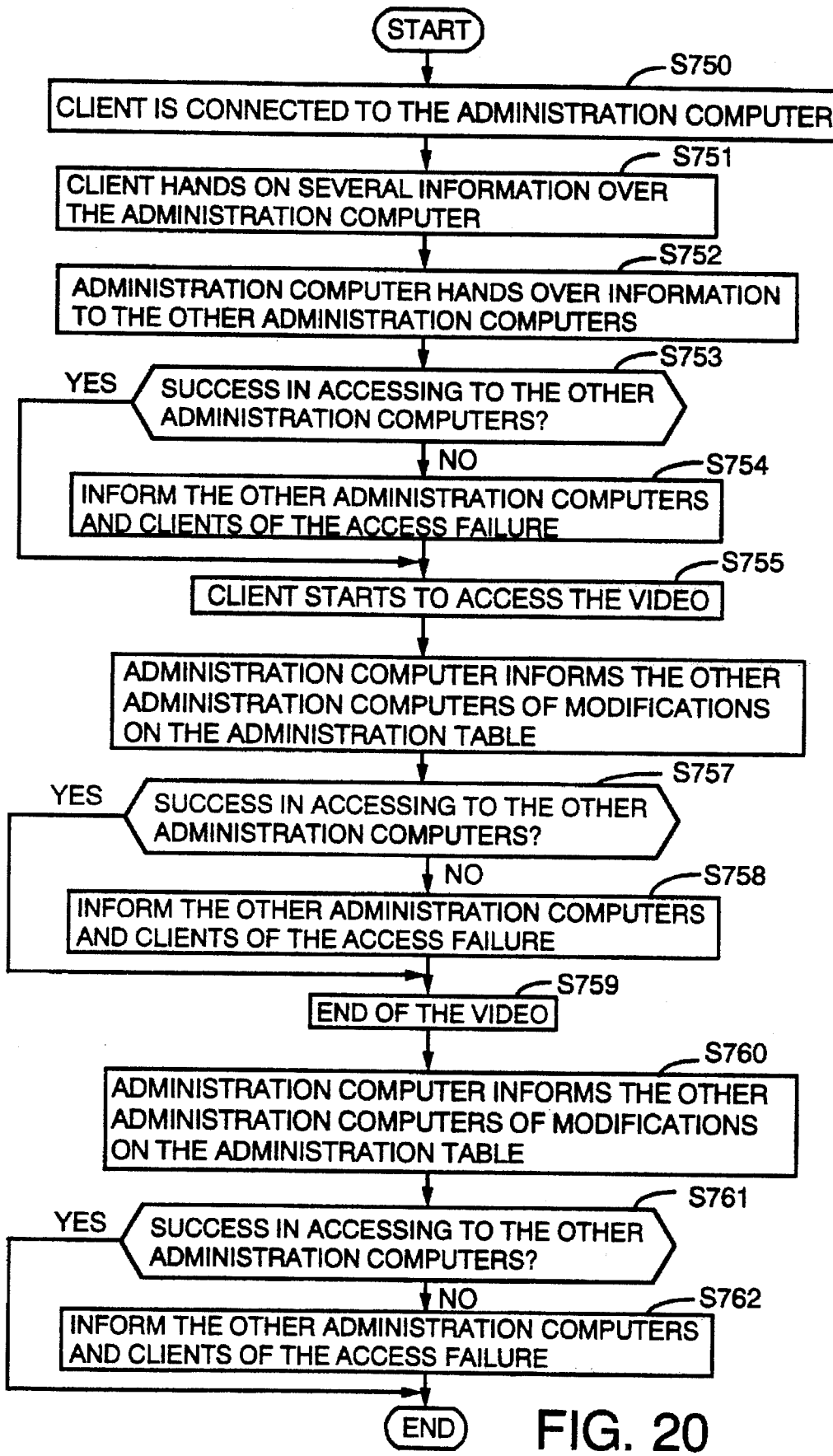
FIG. 20 shows a flow chart showing how a client computer and an administration computer operate according to the eleventh embodiment of the present invention.

The following is an explanation on the operations of client computer 5a and administration computer 5d with reference to the flow chart of FIG. 20, where the client computer 5d (hereinafter, referred to as administration computer 5d) operates as an administration computer, and the rest of the client computers 5a~5c have also a function equivalent to the administration computer.

Step 1: The client computer 5a inputs the name of the administration computer 5d to specify the administration computer, and then the client computer 5a is connected to the administration computer 5d (S 750).

Step 2: The client computer 5a informs the administration computer 5d of information such as the name with regard to the other administration computers (S 751).

Step 3: The administration computer 5d informs the other administration computers that the administration computer 5d operates as an administration computer. The administration computer 5d also requests an administration table to the other administration computers if there is no of ministration table in the administration computer 5d (S 752).

Step 4: When the administration computer 5d filed to access to any one of the other administration computers, the administration computer 5d informs the other administration computers and the client computer 5a (S 753, S 754).

Step 5: The client computer 5a starts to access to a video program, and informs the administration computer 5d which has already started the access. The administration computer 5d then modifies the administration table (S 755).

Step 6: The administration computer 5d informs the other administration computers of the modification made on the administration table (S 756).

Step 7: When the administration computer 5d have failed to access to any one of the other administration computers, the administration computer 5d informs the other administration computers and the client computer 5a of it (S 757, S 758).

Step 8: The client computer 5a informs the administration computer 5d of the completion of the access to the video (S 579).

Step 9: The administration computer 5d makes a modification on the administration table, and then informs the other administration computers of the modification made on the administration table (S 760).

Step 10: When the administration computer 5d failed to access to any one of the other administration computers, the administration computer 5d informs the other administration computers and the client computer 5a of it (S 761, S 762).

According to the present embodiment as described above, if the client computer 5d operates as an administration computer and the rest of the client computers 5a~5c has also a function equivalent to the administration computer, the administration computer 5d informs the other administration computers of the latest state of the accesses to the videos. Therefore, even if administration computer 5d faults, the next client computer can be used as an administration computer. This increases the reliability of the system because the operation can be kept without stopping.

Embodiment 12.

According to the first embodiment, the data is stored sequentially to each magnetic disk unit which is connected to each server computer. In this embodiment, the data is stored sequentially to each server computer (RAID level 0) as explained in the following.

Figure 21:
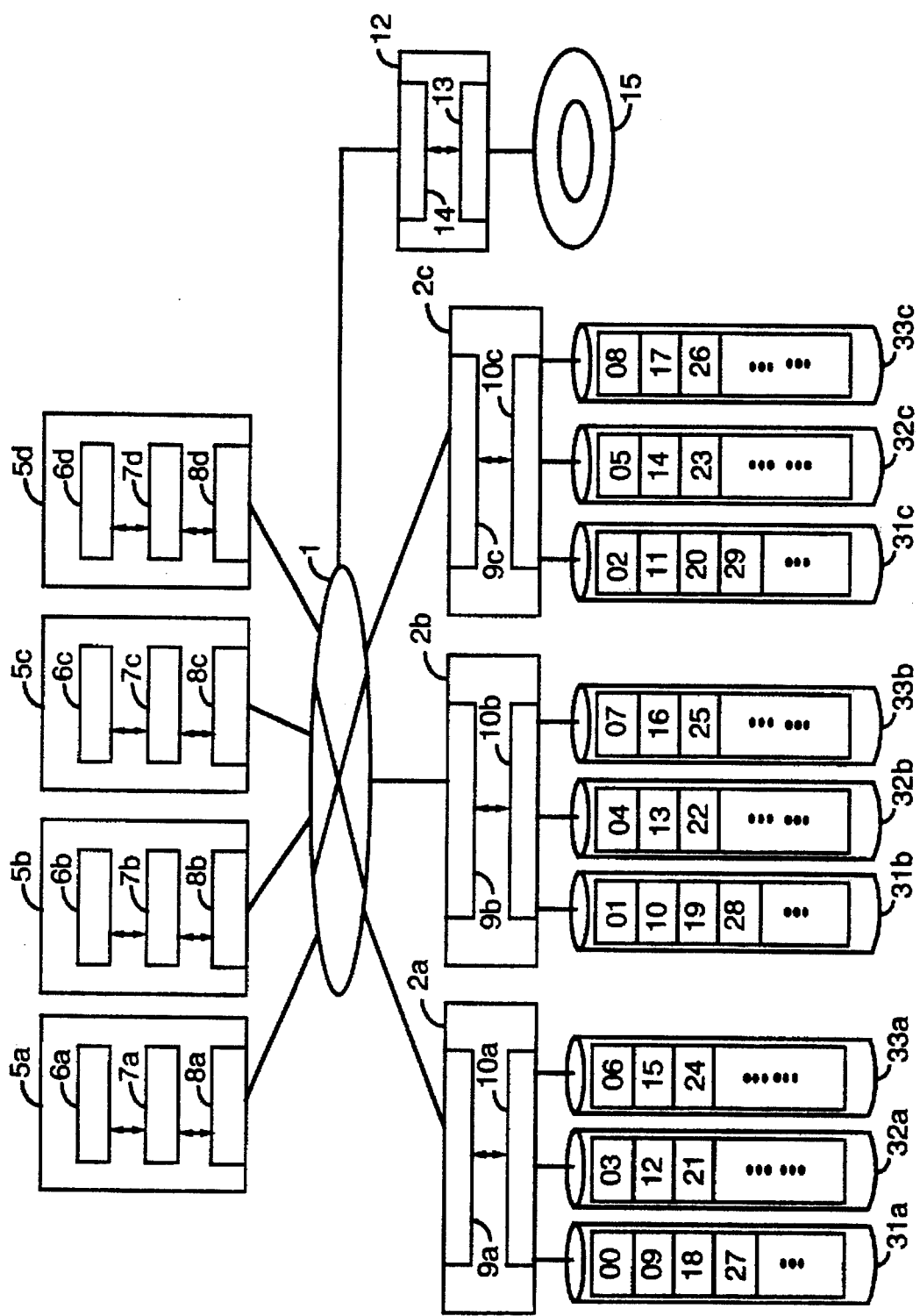
FIG. 21 shows a block diagram showing a construction of a client-server system according to a twelfth embodiment of the present invention.

FIG. 21 shows a configuration of the whole system and the allocation of the data stored therein according to the twelfth embodiment. The elements having the same reference numbers in FIG. 21 are the same portions or the corresponding portions in FIG. 1. Accordingly the detailed explanation of the same portions is omitted. The configuration of FIG. 21 comprises magnetic disk units 31a, 32a, 33a, 31b, 32b, 33b, 31c, 32c and 33c for storing video data. The data is stored in each magnetic disk unit according to the order of the server computer 2a, 2b, 2c, 2a . . .

The following is an example of the processes to read out the block 13 stored in the magnetic disk unit 32b connected to the server computer 2b in the configuration of FIG. 21.

Step 1: A client computer requires the administration computer 12 of the number of the servers and obtains information on it.

Step 2: The client computer caries out the calculation to specify the server in which the block 13 is stored and the location of that data. In the following, ÷ represents a quotient of the division, and % represents a remainder.

(a) Method for calculating the server:

block number % the number of the servers=13% 3=1 (reminder)

where, 0: server computer 2a, 1: server computer 2b, and 2: server computer 2c. Therefore, in this case, the requested server is a server computer 2b.

(b) Method for calculating the data location:

block number÷the number of the servers=13÷3=4 (quotient)

Therefore, the requested data location number is 4, which means the fifth data.

Step 3: The client computer demands the fifth data to the server computer 2b.

Step 4: The server computer 2b calculates according to the following method to find in which disk units and which number of data the fifth data is stored:

(a) Method for calculating the location of the disk unit:

data number from the client % the number of the disk units=4%
3=1 (reminder)

where, 0: magnetic disk unit 31b, 1: magnetic disk unit 32b, and 2: he magnetic disk unit 33b. Therefore, the requested disk unit is the magnetic disk unit 32b.

(b) The method of calculation of the number of data:

data number from the client÷the number of the disk units=4÷3=1
(quotient)

Therefore, the requested data location No. is 1, which means the second data in the magnetic disk unit 32b.

Step 5: The server computer 2b reads out the second data in the magnetic disk unit 32b according to the result obtained in the step 4, and then the read-out data is handed over to the client computer.

As described above, according to this embodiment, the data is stored sequentially to each server computer, so that the block 1 is stored in a magnetic disk unit of the server 1, the block 2 is stored in a magnetic disk unit of the server 2, the block 3 is stored in a magnetic disk unit of the server 3, and the block 4 is stored in a magnetic disk unit of the server 4 and so on. This brings the effect to equally distribute a load over a plurality of server computers.

If the data is stored in the above-mentioned manner, it allows a client computer to recognize which data should be read next without knowing the number of the magnetic disk units connected to each server computer. This brings the effect to downsize a client program, and lessen the load to the client program because the process for specifying the client computer program can be omitted.

Embodiment 13.

In this thirteenth embodiment, the data-storing order is the same as that of the twelfth embodiment and the data is copied to the other server computers other than the server computer in which the data is stored (RAID level 1) which is described in the third embodiment.

Figure 22:
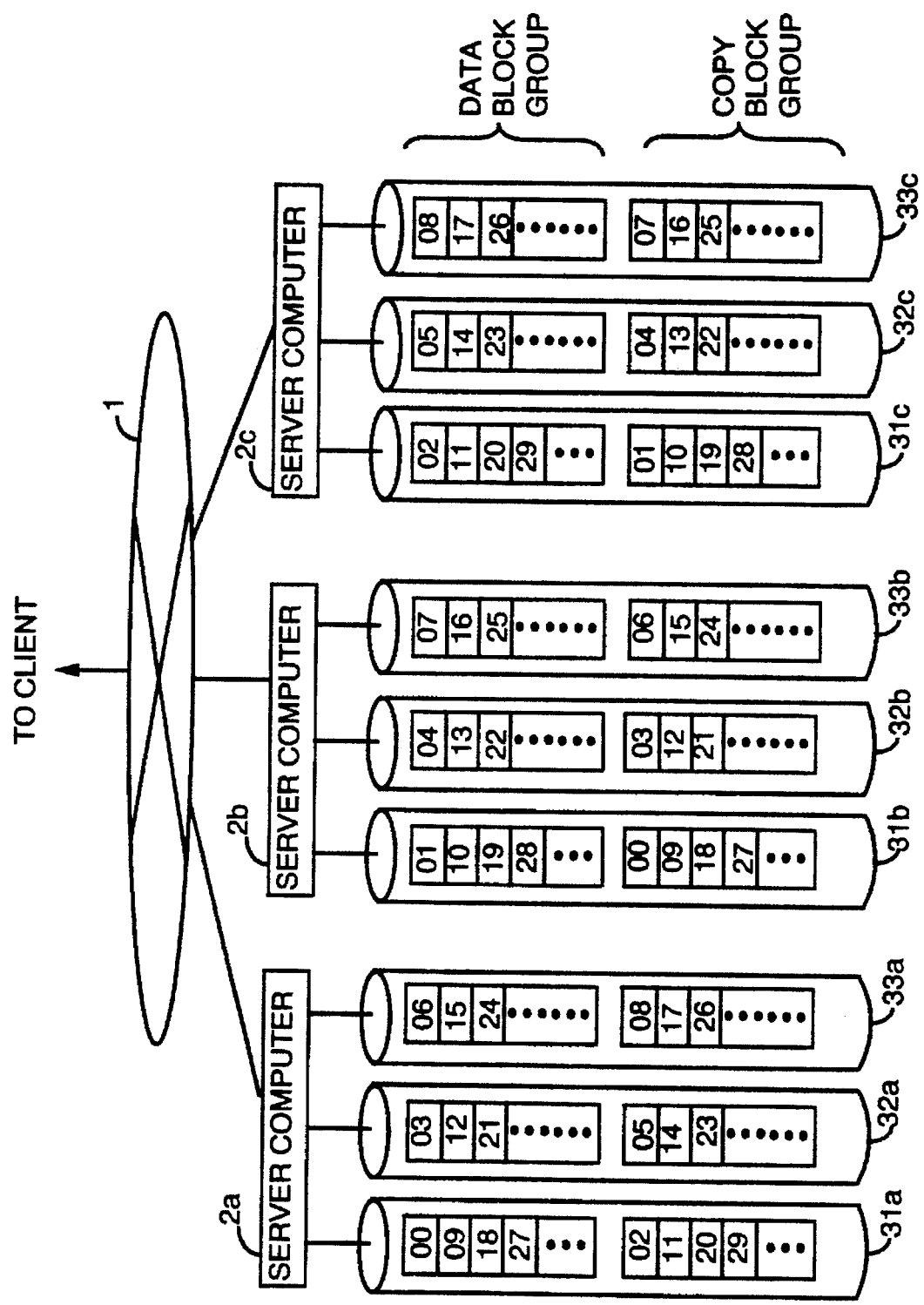
FIG. 22 shows a diagram illustrating how data is stored according to a thirteenth embodiment of the present invention.

FIG. 22 shows how the data and copy data are stored in the system. The elements having the same reference numbers in FIG. 22 are the same portions or the corresponding portions in FIG. 1 Accordingly the detailed explanation of the same portions is omitted. The data are stored into each magnetic disk unit connected to the server computers 2a, 2b, 2c, 2a, . . . according to their orders, and the data are also copied into each magnetic disk unit connected to the server computers 2b, 2c, 2a, 2b, . . . according to their orders. In this case, the data copy starts from the server computer 2b. However, it can be arbitrarily started from any server computers other than server computer where the data is stored therein.

As described above, according to this embodiment, the identical data is read out from any magnetic disk units which are connected to other server computers, even if any one of the server computers or the magnetic disk units faults. This increases the reliability of the system.

According to the conventional RAID level 1, only one of the two disk units is available for reading out a single data because only the back-up data is stored in the mirror side disk unit. However, according to the present embodiment, a single disk unit stores both the data and the back-up data. This is advantageous in that two different data are read out simultaneously if there are two disk units.

Embodiment 14.

According to the eighth embodiment, parities are distributed to each magnetic disk unit connected to each server computer. In this fourteenth embodiment, the parities are stored in a different location which is different from that of the eighth embodiment.

Figure 23:
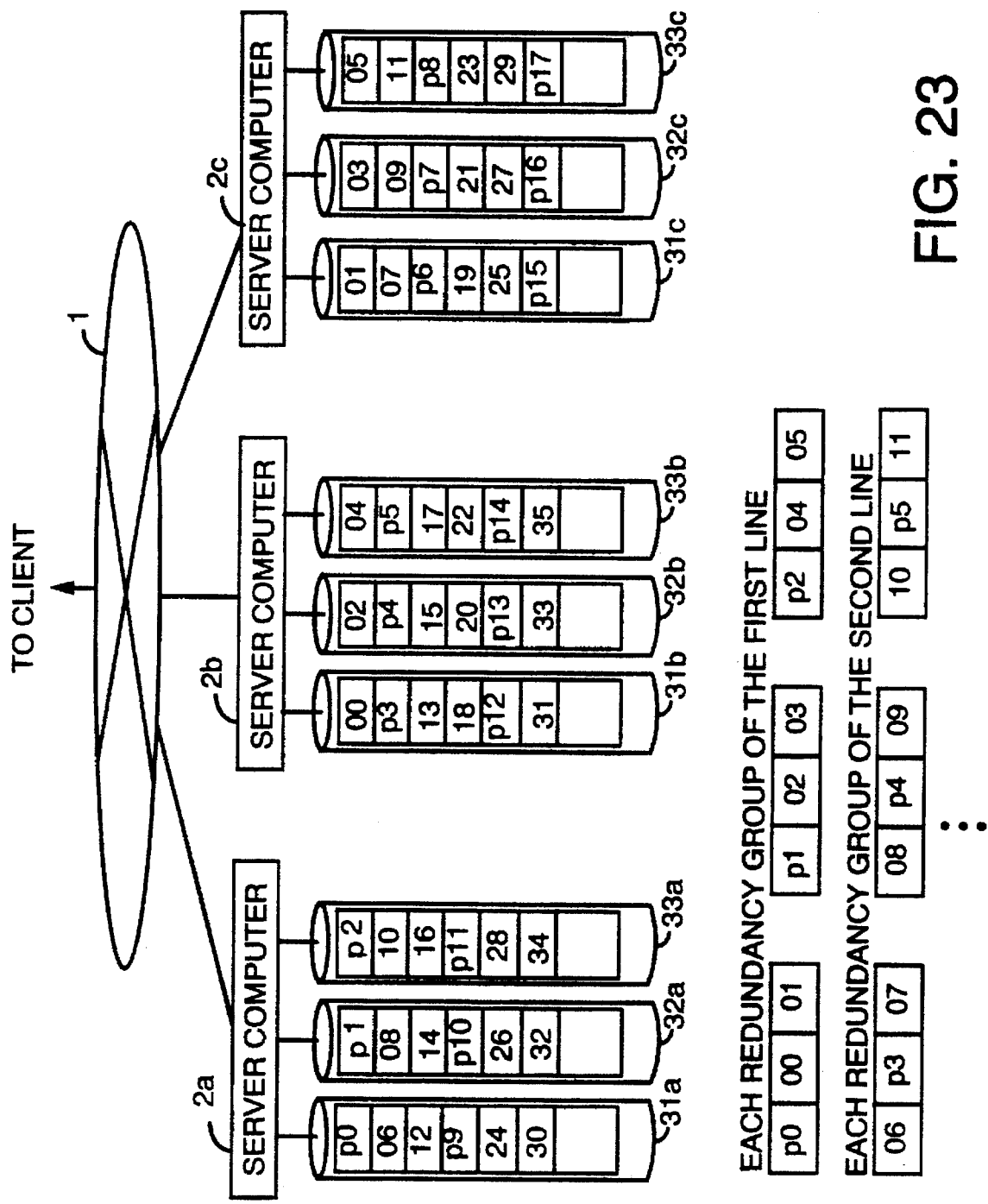
FIG. 23 shows a diagram illustrating how data and parities are stored according to a fourteenth embodiment of the present invention.

FIG. 23 is a block diagram showing that three magnetic disk units are connected to each server computer and how the data and the parities are stored therein according to the present embodiment. The elements having the same reference numbers in FIG. 23 are the same portions or the corresponding portions in FIG. 1 Accordingly the detailed explanation of the same portions is omitted. In FIG. 23, there are magnetic disk units 31a, 32a, 33a, 31b, 32b, 33b, 31c, 32c and 33c for storing parities distributed to each of these magnetic disk units.

In this embodiment, a parity corresponds to each data is generated by the following calculation:

parity $pn$=block $2n$ (+) block $2n+1$ where, n represents the block number

Also in this embodiment, the data and the parities form a redundancy group. For example, a redundancy group of the first row consists of p0, 00, 01 or p1, 02, 03, where, p0 and p1 show parities and 00–03 shows data.

Each of the data and parity which form a redundancy group is stored sequentially to each server computer. For example, in case of the redundancy group consisting of p0, 00, 01, the parity p0 is stored in the server computer 2a, the data 00 is stored in the server computer 2b, and the data 01 is stored in the server computer 2c.

The parities are stored in the following manner. For example, the parities p0, p1, p2 which belong to the first-row redundancy groups are stored in the magnetic disk units 31a, 32a, 33a which are connected to the server computer 2a, respectively. The parities p3, p4, p5 which belongs to the second-row redundancy groups are stored in the magnetic disk units 31b, 32b, 33b which are connected to the server computer 2b, respectively.

The location of the parities are calculated as follows:
(a) Method for calculating the location of the server, which stores the parities of a redundancy group including data of a certain block number:

block number÷(the number of the disk units×(the number of the servers−1)) % the number of the server (b) Method for calculating the location of the disk unit:

block number÷(the number of the servers−1) % the number of the disk units.

(c) Method for calculating the location of the parities:

block number÷(the number of the disk units×(the number of the servers−1))

The following is an calculation example in case of the block number 13 as shown in the configuration of FIG. 23.
(a) server:

13÷(3×(3−1)) % 3=2 (reminder)

where, 0: server computer 2a, 1: server computer 2b, and 2: server computer 2c. Therefore, the result shows that the requested server computer is 2c in this case.
(b) disk unit:

13÷(3−1) % 3=0 (reminder)

where, 0: magnetic disk unit 31c, 1: magnetic disk unit 32c, 2: magnetic disk unit 33c.

Therefore, the result shows that the requested magnetic disk unit is 31c.
(c) the location of the parities:

13÷(3×(3−1))=2 (quotient)

where, 0: parities in the first row, 1: parities in the second row and 2: parities in the third row and so on.

Therefore, the result shows that the requested parity is in the third row.

The following shows an example for calculating the location of data:
(a) The method for calculation the location of the server:
(i) "block number % (the number of the servers−1)" is calculated.
(ii) "block number÷(the number of the disk units×(the number of the servers−1)) % the number of the server" is calculated.
(iii) the resultant value of (i) and the resultant value of (ii) are compared.
(iv) if the resultant value of (i) is equal or larger than the resultant value of (ii), 1 is added to the resultant value of (i).

(b) Method for calculating the disk unit:

block number÷(the number of the servers−1) % the number of the disk units.

(c) Method for calculating the location of data:

block number÷(the number of the disk units×(the number of the servers−1))

For example, the following is an example in case of the block number 13 in the configuration of FIG. 23.
(a) server:

13% (3−1)=1 (reminder)

location of the parity=13÷(3×(3−1)) % 3=2 (reminder)

According to the above-mentioned condition, the server number is 1, since 1<2, where 0: server computer 2a, 1: server computer 2b, and 2: server computer 2c.

Accordingly, the result shows that the requested server is a server computer 2b.
(b) disk unit:

13÷(3−1) % 3=0 (reminder)

where, 0: magnetic disk unit 31b, 1: magnetic disk unit 32b, and 2: magnetic disk unit 33b.

Therefore, the result shows that the requested disk unit is the magnetic disk unit 31b.
(c) the location of the data:

13÷(3×(3−1))=2 (quotient)

where, 0: data in the first row, 1: data in the second row, and 2: data in the third row and so on.

Therefore, the result shows that the requested location of the data is in the third row.

According to this embodiment, since both the data and the parities are arranged in each disk unit as shown above, there is no disk unit which stores only the parities although the data accompanies the parities. Therefore, during a normal operation, all disk units connected to the server computers are always operating, regardless to the number of disk units and servers. Accordingly, the system is utilized more effectively and performs well during the normal operation than the other systems accompanying parities.

Embodiment 15.

According to the fourteenth embodiment, parities are stored distributedly in each server computers and where location of the parities are calculated from the number of disk units connected to each server and the row in which the parities belong. In this fifteenth embodiment, parities are stored in a different location from that of the fourteenth embodiment.

Figure 24:
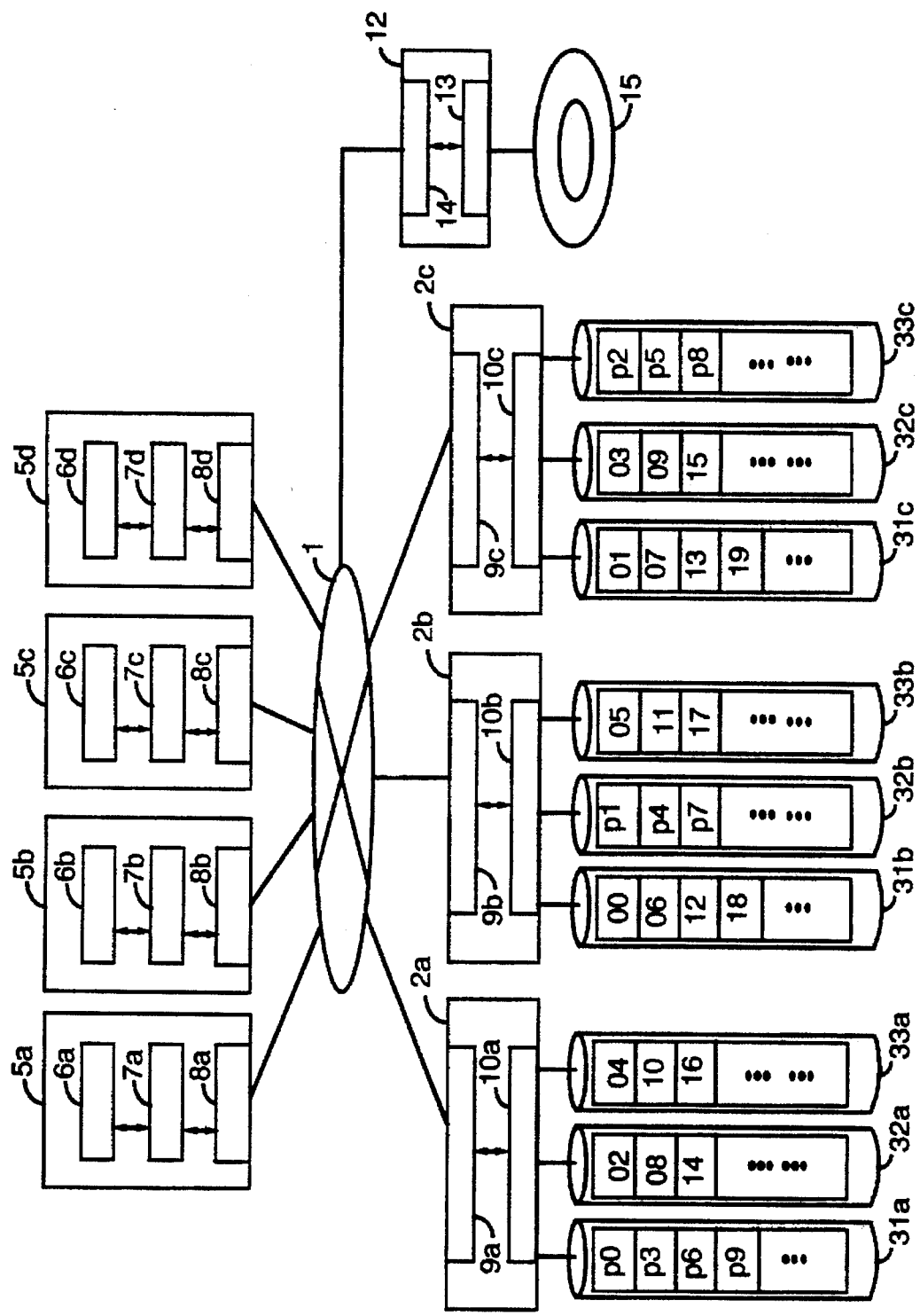
FIG. 24 shows a block diagram showing a construction of a client-server system according to a fifteenth embodiment of the present invention.
Figure 25:
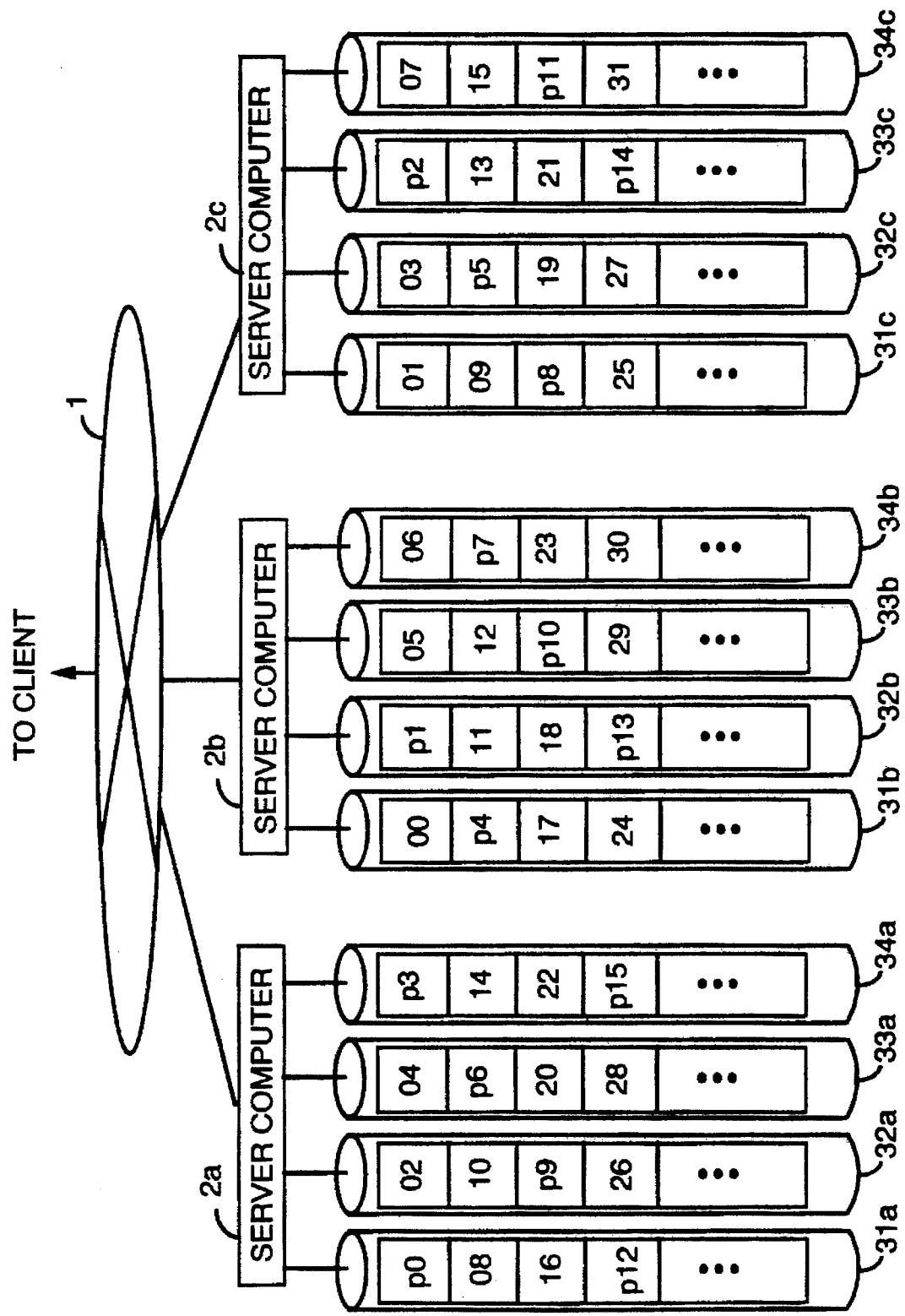
FIG. 25 shows a diagram illustrating how data is stored according to the fifteenth embodiment of the present invention.

FIG. 24 and FIG. 25 are block diagrams showing how the data and parities are stored according to the fifteenth embodiment. In FIG. 24, three magnetic disk units are connected to each server computer. In FIG. 25, four magnetic disk units are connected to each server computer. The elements having the same reference numbers in FIGS. 24, 25 are the same portions or the corresponding portions in FIG. 1 Accordingly the detailed explanation of the same portions is omitted. In FIG. 25, magnetic disk units 34a, 34b, and 34c are the same as the rest of the disk units where the data and the parities are distributed and stored.

In this embodiment, the data and the parities are stored for every redundancy group. For example, a redundancy group consists of p0, 00, 01 or 02, p1, 03, are arranged sequentially to each server computer, where p0 and p1 shows parities and 00~03 shows data. The position of parities in each redundancy group is shifted by one from the position where the parities in the preceding redundancy group are placed. For example, the parity p0 in the redundancy group of p0, 00, 01 is stored in the magnetic disk unit 31a connected to the server computer 2a, and the parity p1 in the redundancy group of 02, p1, 03 is stored in the magnetic disk unit 32b connected to the server computer 2b.

The location of data and parities can be calculated as following.

(a) Method for calculating the location of the server which stores the data or parities of a redundancy group including data of a certain block number):

First, the location of a server which stores the parities is calculated as follows at the client side:

block number÷(the number of the servers−1) % the number of the server

Second, the location of a server which stores the data is also calculates as follows at client side:

block number % (the number of the servers−1)

If the resultant value obtained from the second formula is larger than the value calculated by the first formula, 1 is added to the value obtained from the second formula.

(h) Method for calculating the disk unit:

First, the value of the data number/the parity number is calculated as follows at the client side. The value is then handed over to the server computers. The server computer calculate the location of the disk unit as follows using result obtained at the above step (a):

client: block number÷(the number of the servers−1)

server: the data number/the parity number % the number of the disk units.

(c) Method for calculating the location of data and parities:

A server computer calculates the location of the data and the parities according to the value of the data number/the parity number.

data number/the parity No÷the number of the disk units.

For example, the following is an example in case of the block number 13 in the configuration of FIG. 25.

(a) location of a server:

First, a location of the server where the parities are stored is calculated:

13÷(3−1) % 3=0 (reminder)

where, 0: server computer 2a, 1: server computer 2b, and 2: server computer 2c.

Accordingly, the result shows that the requested server is the server computer 2a.

Second, a location of the server where the data is stored is calculated:

13% (3−1)=1 (reminder)

According to the condition mentioned above, since the location of the server which stores the parity is 0, and 1>0,then the location of the server is shown as 2(=1+1), where, 0: server computer 2a, 1: server computer 2b, and 2: server computer 2c.

Accordingly, the result shows that the requested location of the server is a server computer 2c.

(b) location of a disk unit:

First, data number/the parity number are calculated as follows at the client side.

13÷(3−1)=6(data number/the parity number)

The result then handed over to each server computer to calculate to calculate the disk unit location.

A disk unit location which stores the parities is:

6% 4=2 (reminder)

where, 0: magnetic disk unit 31a, 1: magnetic disk unit 3

Therefore, the result shows that the requested location of the disk unit is the magnetic disk unit 33a.

A location of the disk unit which stores the data is:

6% 4=2 (reminder)

where, 0: magnetic disk unit 31c, 1: magnetic disk unit 32c, 2: magnetic disk unit 33c and the numeral 3 represents the magnetic disk unit 34c.

Therefore, the result shows that the requested location of the disk unit is the magnetic disk unit 33c.

(c) Method for calculating the location of data and parities:

Each server computer calculates the locations of the data and the parities in the same manner as described in the step above (b).

The location of the parity is: 6÷4=1 (quotient)

where, 0: parities in the first row, 1: parities in the second row, and 2: parties in the third row and so on.

Therefore, the result shows that the requested location of the parities is in the second row.

The location of the data is: 6÷4=1 (quotient)

where, 0: data in the first row, 1: data in the second row, and 2: data in the third row and so on.

Therefore, the result shows that the requested location of the data is in the second row.

If the data is stored in the above-mentioned manner, it allows a client computer to recognize which data should be read next without knowing the number of the magnetic disk units connected to each server computer. This brings the effect to downsize a client program, and lessen the load to the client program because the process for specifying the client computer program can be omitted.

Moreover, although the number of the disk units connected to each server is selected to be the same in the above case, but, if the data and the parities are arranged in the above-mentioned manner, the number of the disk units connected to each server can be arbitrarily selected and does not necessarily have the same number of disk units.

In case of FIG. 25, there is no magnetic disk unit which stores only the parities, however in case of FIG. 24, if the number of the magnetic disk units connected to the server computers is integer times of the number of the server computers, there is a possibility of making a disk unit which stores only the parities. Since such magnetic disk unit which stores only the parities does not operate during a normal operation, the utilization efficiency of the whole system deteriorates. On the other hand, if the data and the parities are arranged in the above-mentioned manner, such parity disk unit can operate in place of a fault parity disk. In other words, the performance of the system in a degeneracy state is not different from that in the normal state. Accordingly, it is possible to use the configuration, FIG. 24 or FIG. 25 depending on a system.

Moreover, if the data and the parities are arranged in the above-mentioned manner, the arrangement has an advantage that the number of the buffers required by a client is equal to "the number of the server computers−1".

Figure 26:
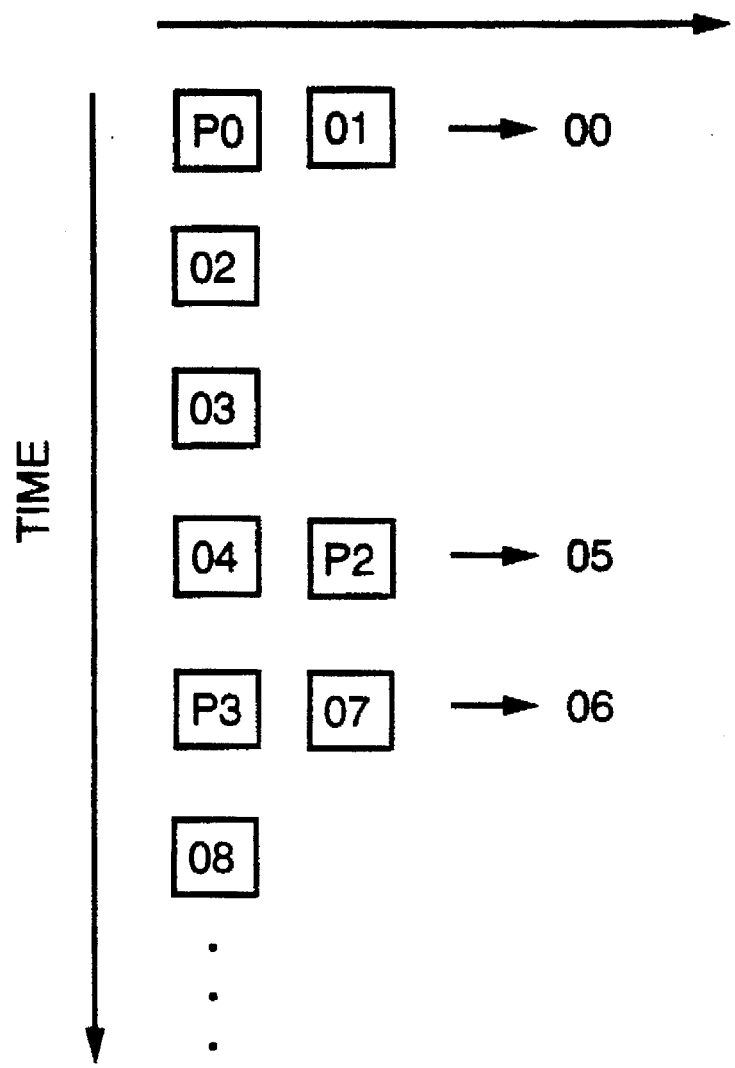
FIG. 26 shows a diagram showing the contents of buffers used by the client of the fifteenth embodiment of the present invention.

FIG. 26 illustrates the content of the data for the time change in a buffer used in a client when the server computer 2b of FIG. 24 faults.

Figure 27:
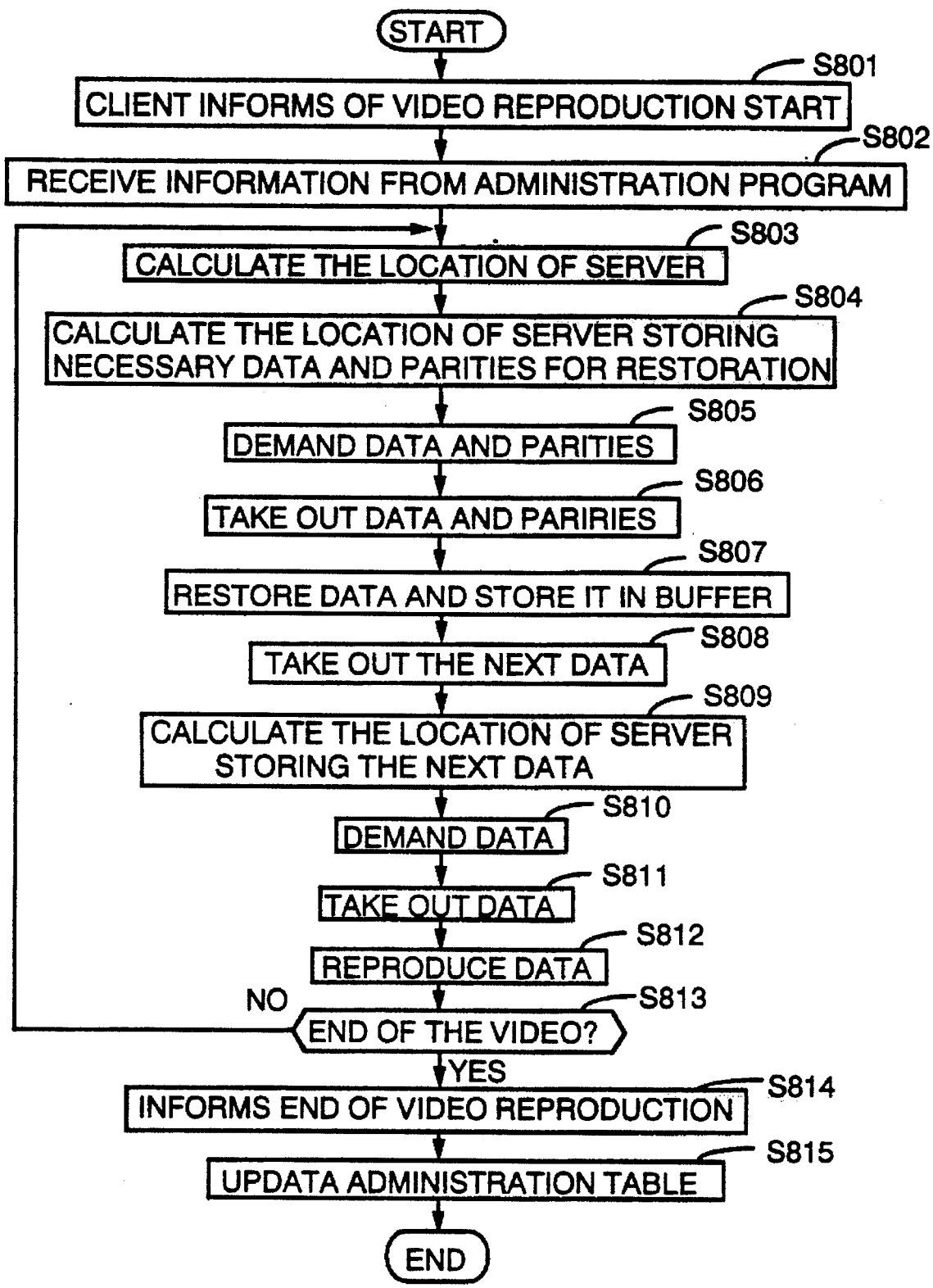
FIG. 27 shows a flow chart showing how a video program is read out according to the fifteenth embodiment of the present invention.

The following is an explanation on an operation to read out a video program when the server computer 2b becomes out of order with reference to FIG. 27. In the following case, it is assumed that the head block number of the video is 0.

Step 1: A client informs the administration computer of reproduction start before starting a video program reproduction (S 801). The administration computer informs the client of information on the number of the servers, the head block number of the video and the fault server computers (S 802).

Step 2: The client calculate the location of the server which stores the data of the block number 0 to take out that data by the above mentioned method (a) in accordance with information sent from the administration computer. The client then specifies the location of the server computer 2b which stores the data of the block number 0 (S 803).

Step 3: In this case, since the client has been informed of the fault of the server computer 2b, the client then specifies the location of the servers which store the data and parities which are necessary for restoring the data of the block number 0 by the following calculations (S 804).

(1) First, calculate the block numbers of the other data which belongs to the same redundancy group as that of the block number 0.

method for calculating the head block number:

block number−(block number % (the number of the servers−1))

method for calculating the last block number:

head block number+(the number of the servers−2)

In this case, head block number=0−(0% (3−1))=0 last block number=0+(3−2)=1

Therefore, the block numbers of the other data which belong to the same redundancy group are 0 and 1.

Since block number 0 is the object number in the current explanation, a block number of the data in the same redundancy group is 1.

(2) A location of the server which stores the data of the above block number can be specified as the server computer 2c by the above-mentioned method (a). The data number/the parity number are calculated in accordance with the above-mentioned calculation (b) and obtained as 0.

(3) The location of the server which stores the parities which belong to the same redundancy group as that of the block number 0 is specified as a server computer 2a by the above-mentioned calculation (a). (However, this calculation is omitted actually because the value has been already calculated in the process (2)).

(4) The client sends the data number/the parity number to the servers which have been specified in the above steps (2) and (3) to demand them to read out the data and the parities having that numbers (S 805).

Step 4: Each server to which the data and the parities are demanded carries out the above-mentioned calculation methods (b) and (c) for calculating the locations of data and parities, to read out the demanded data and parities and send them to the client (S 806).

Step 5: The client restores the data of the block number 0, using the data and parities which have been sent to the client. At the time, the client releases a buffer and stores the parity p0, the data 00 and the data 01 to the buffer as shown in FIG. 26 (S 807).

Step 6: The client then needs the data of the block number 1, but since the data of the block number 1 has already been stored in the buffer, the client takes the data out of the buffer, instead of reading it out via the server (S 808).

Step 7: The client then calculates the location of the server where the data of the block number 2 is stored by the above-mentioned calculation (a), and obtains the server computer 2a. Further, the client calculates the data number/ the parity number in accordance with the above-mentioned calculation (b). The result shows that the data number/the parity number is 1 (S 809).

Step 8: The client sends the data number/the parity number to the server computer 2a to demand the data of the block number 2 (S 810).

Step 9: The server computer 2a carries out the above-mentioned calculation methods (b) and (c) for calculating the location of data and parities to specify the location of the disk, and reads out the data of the block number 2 to sent them to the client (S 811).

Step 10: The client reproduces the data received and releases the buffer, and stores the data of block number 2 in the buffer (S 812).

The steps 2~10 are repeated until the last video data is read out (S 813).

The following is a summary of the above-mentioned operation of the client.

1. The client tries to read out the data 00. However, because the server computer 2b faults, the client computer reads out the parity p0, the data 01 from the server computers 2a, 2c to calculates the data 00.

2. Since the data 01 has already been stored in the buffer, it does not need to be read out from the magnetic disk unit.

3. The data 03 is read out.

4. The data 04 is read out.

5. The client tries to read out the data 05. However, because the server computer 2b faults, the client computer reads out the data 04, the client computer reads out the parity p2 from the server computers 2a, 2c. The data 04 has been already stored in the buffer, it does not need to read out from the magnetic disk unit. Accordingly, the client reads out only the parity p2 to calculates the data 05.

6. The client tries to read out the data 06. However, because the server computer 2b faults, the client computer reads out the parity p3, the data 07 from the server computers 2a, 2c, respectively, to calculates the data 06.

7. The data 07 has been already stored in the buffer, it does not need to read out from the magnetic disk unit.

8. The data 08 is read out.

The similar processes for reading out data is repeated hereinafter.

Step 11: The client informs the administration computer 12 of the completion of the video reproduction (S 814).

Step 12: The administration computer 12 makes a modification on the administration table in response to the completion of the video reproduction (S 815).

As described above, according to this embodiment, when a server computer faults, any inaccessible data is restored by using the data and the parities stored in the magnetic disk units connected to the accessible other servers. This increases reliability of the system.

Moreover, the number of the buffers which are required by a client is always "the number of the server computers−1", regardless the number of the disk units connected to each server (in the other embodiments, it may be "(the number of the servers−2)×the number of the disk units+1").

Although in this embodiment, three or four magnetic disk units are connected to each server computer, whatever number of the disk units connected to the server computer and the number of the servers can be selected according to the system.

Embodiment 16.

According to the embodiments so far, a client is regarded as a user terminal. However, in this embodiment, the client can be used as a concentrator which is able to provide a video stream simultaneously and in parallel to each of a plurality of user terminals inter-connected in a wide-area.

Figure 28:
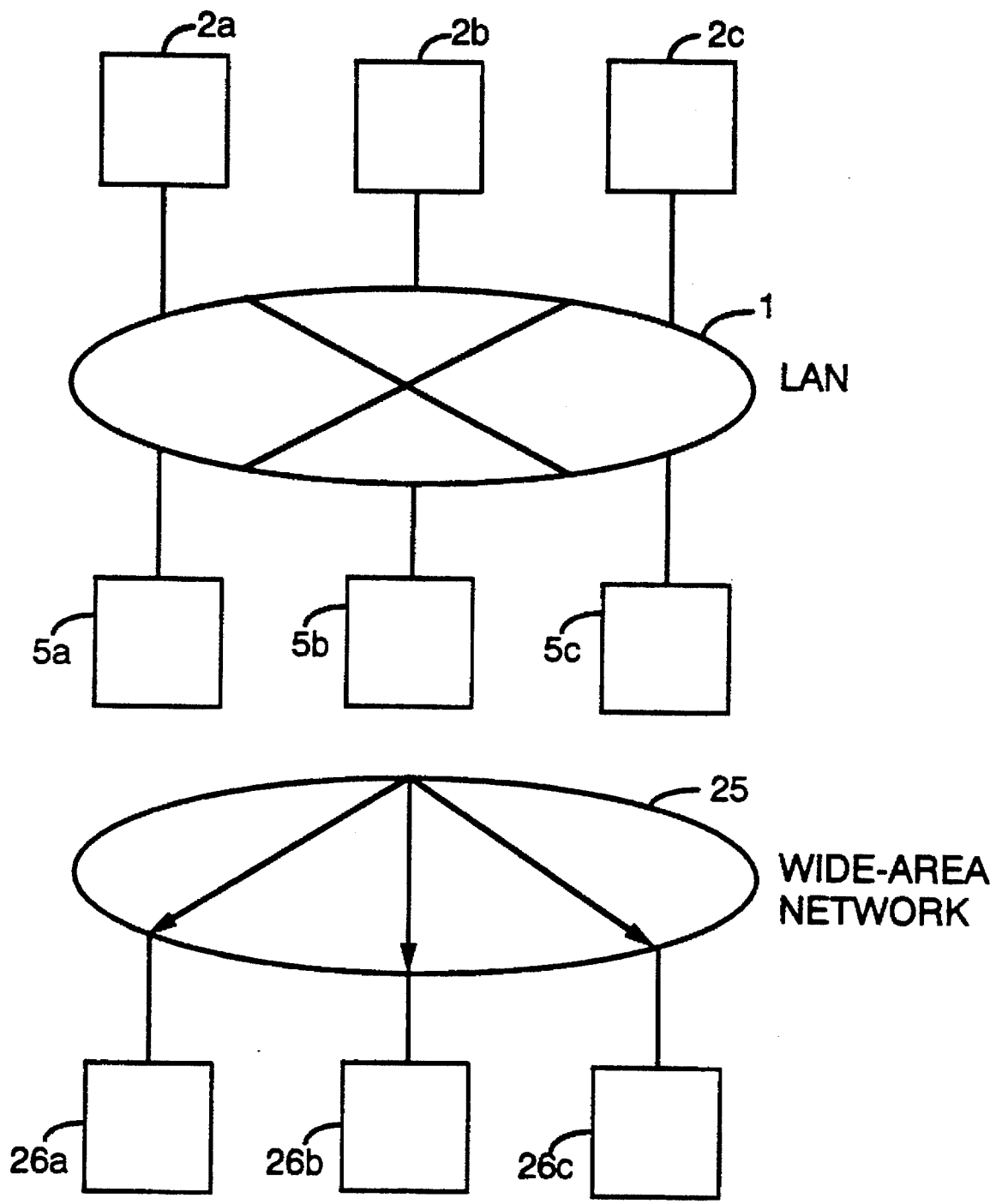
FIG. 28 shows a block diagram showing a construction of a client-server system according to a sixteenth embodiment of the present invention.
Figure 29:
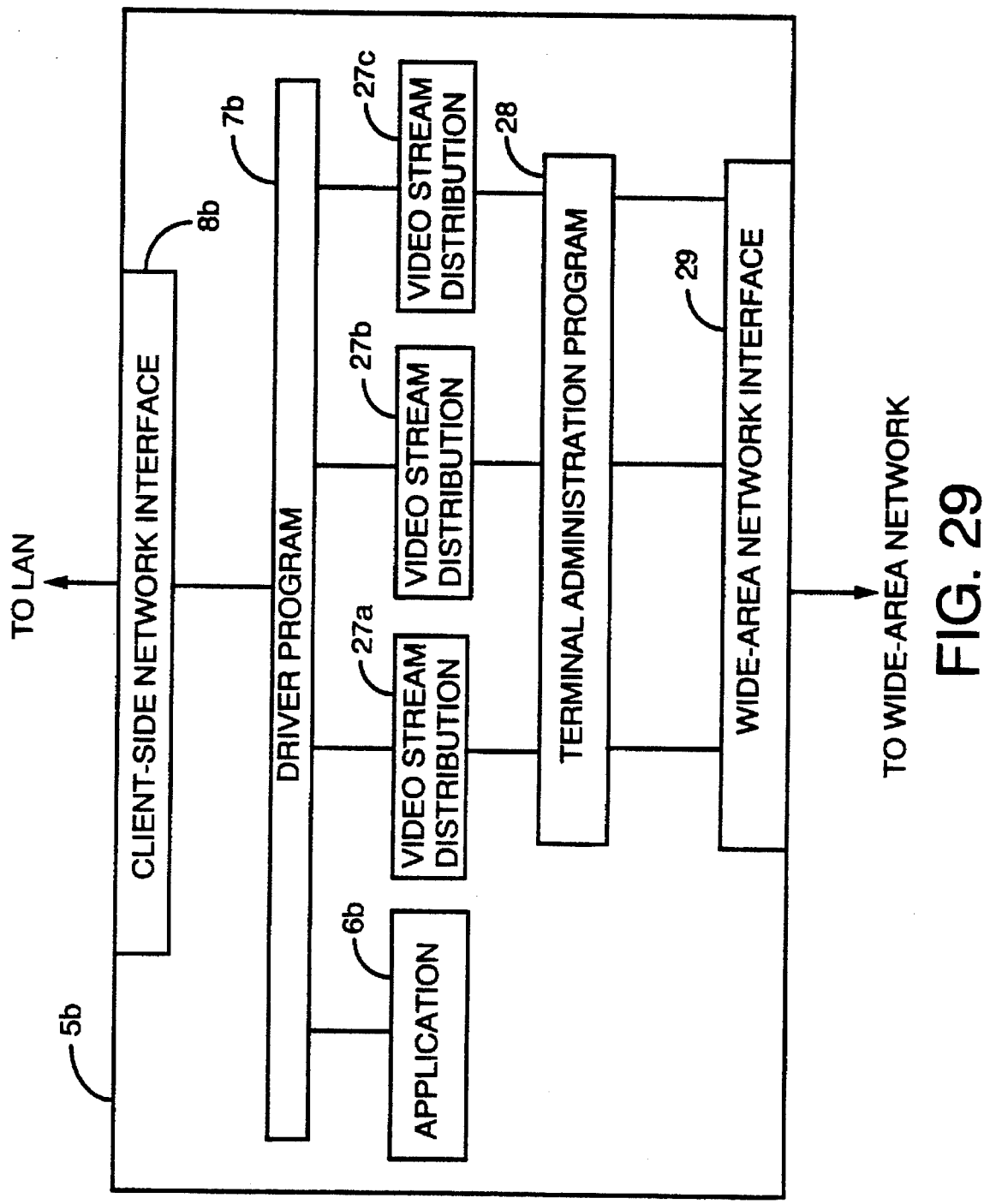
FIG. 29 shows a block diagram showing a construction inside the client of the sixteenth embodiment of the present invention.

FIG. 28 is a block diagram showing a configuration of the present sixteenth embodiment. FIG. 29 is a block diagram showing the inside of a client according to the present embodiment. The elements having the same reference numbers in FIGS. 28, 28 are the same portions or the corresponding portions in FIG. 1 Accordingly the detailed explanation of the same portions is omitted. The configuration of FIG. 28 comprises a wide-area network 25 such as telephone line, and user terminals 26a~26c which are connected to this wide-area network 25. The configuration of FIG. 29 comprises video stream distribution programs 27a~27c for sending video streams upon a demand from each of the user terminals 26a~26c connected to the wide-area network 25, terminal administration program 28 for administrating a demand from each of the user terminals 26a~26c connected to the wide-area network 25 and providing each user terminals 26a~26c simultaneously and in parallel, and wide-area network interface 29 which realizes an interface with the wide-area network 25. Although only the client computer 5b is connected to the wide-area network 25 in this embodiment, the rest of the client computers can also be connected to the wide-area network 25. As illustrated in FIG. 28, each client can have either one of the function as a user terminal or as a concentrator for the wide-area network, or even the both functions.

Figure 30:
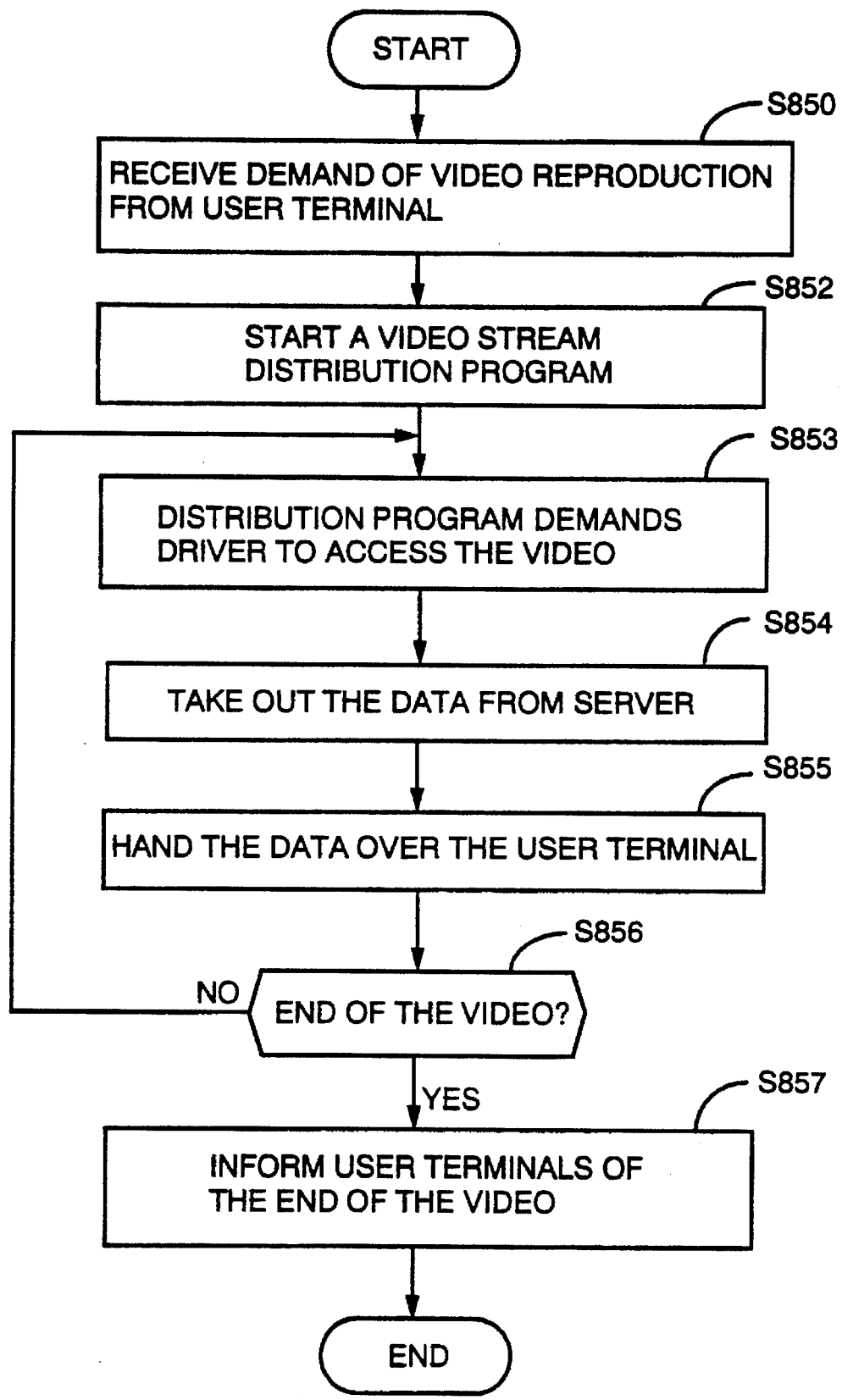
FIG. 30 shows a flow chart showing how a video program is read out according to the sixteenth embodiment of the present invention.
Figure 31:
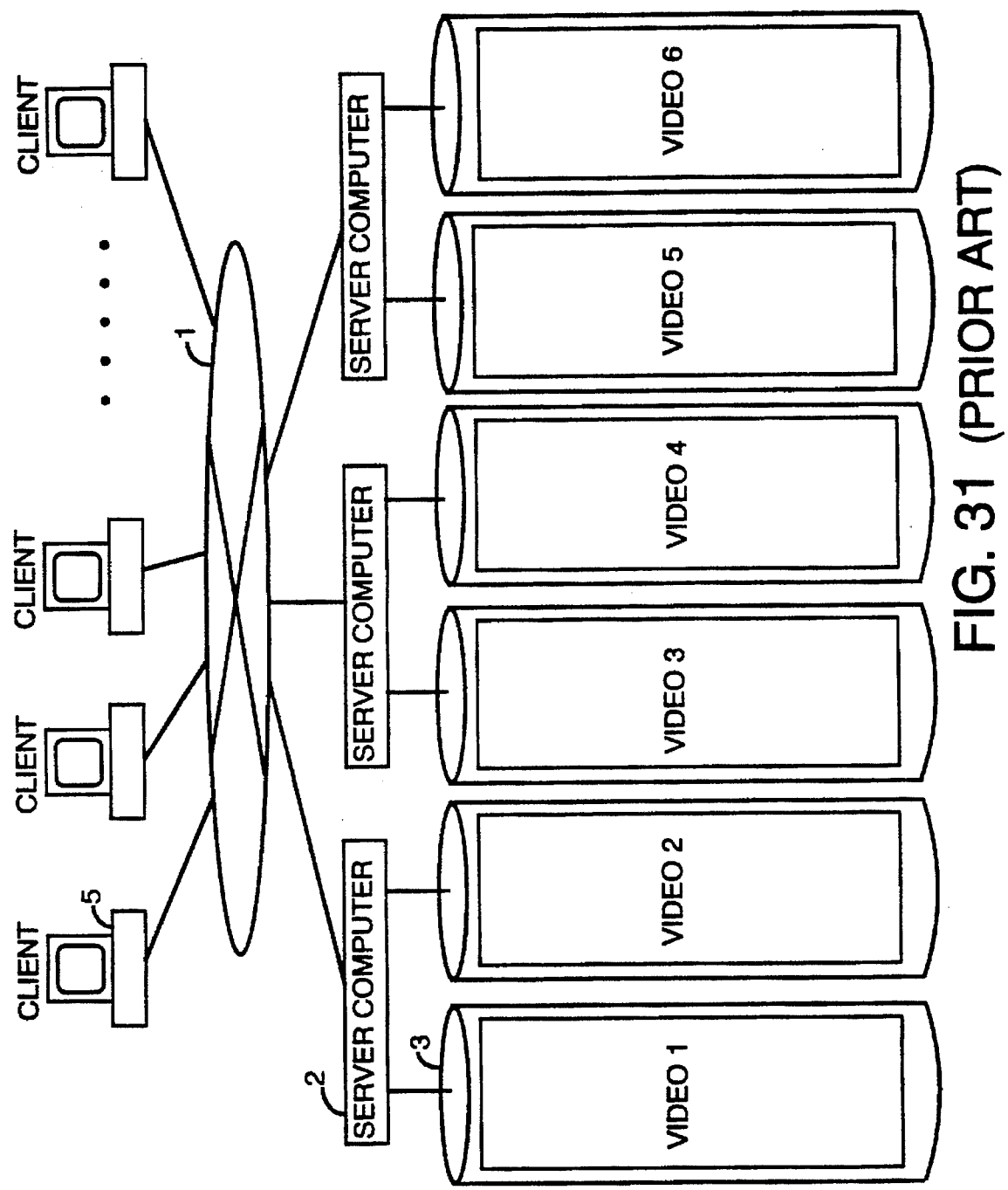
FIG. 31 shows a block diagram showing a conventional video server system.

The following is an explanation on how the system of FIG. 28 operates when one of the user terminals 26a~26c connected to the wide-area network 25 demands the client computer 5b to reproduce a video, with reference to a flow chart of FIG. 30.

Step 1: Each of the user terminals 26a~26c demands the client computer 5b to send a video stream via the wide-area network 25 and the wide-area network interface 29 when it starts to reproduce a video program (S 851).

Step 2: The terminal administration program 28 in the client computer 5b starts each of the video stream distribution programs 27a~27c upon receiving each demand from the user terminals 26a~26c (S 852).

Step 3: Each of the video stream distribution programs 27a~27c demands the access to the video data to the driver program 7b (S 853).

Step 4: The driver program 7b takes out the data from the server in the manner as mentioned above, and hands it over to the video stream distribution programs 27a~27c (S 854).

Step 5: The video stream distribution programs 27a~27c send out the video data to the user terminals 26a~26c (S 855).

Step 6: The steps 3~5 are repeated until the end of the video data (S 856).

Step 7: When the video data come to an end, the client computer 5b informs the user terminals 26a~26c of it (S 857).

According to the sixteenth embodiment as described above, data is efficiently forwarded to a plurality of user terminals connected to wide-area network.

Although there are three user terminals in this embodiment, the number of the user terminals can be changed as to more than two user terminals, depending on the capacity of the client.

What is claimed is:

1. A client-server system comprising:

(a) a plurality of storage devices for storing data wherein said data is distributed in said plurality of storage devices;

(b) a plurality of servers, each of which is connected to a portion of said plurality of storage devices, for accessing said data;

(c) an administration apparatus which is connected to said plurality of servers, the administration apparatus comprises:

(c1) an administration means for administrating said data stored in said plurality of storage devices, and said plurality of servers;

(c2) a parity storage device for storing parities;

(c3) an inter-server parity generation means for generating parities from said data stored in said plurality of storage devices connected to said plurality of servers, and for storing said generated parities into said parity storage device; and (c4) an inter-server restoration means for restoring data which are stored in an inaccessible storage device connected to a server, using data which are stored in accessible storage device and parities which are stored in said parity storage device, when any one of said plurality of storage devices becomes inaccessible, and for storing said restored data into said parity storage devices; and (d) a client which is connected to both said administration apparatus and said plurality of servers, wherein said client comprises:

(d1) an access demand means for specifying a server, identified by said administration apparatus, which is connected to a storage device where a head block of said data is stored, and for accessing said data through said plurality of servers according to an order in which said data is distributed in the plurality of storage devices after said specified server, and for informing the inter-server restoration means of a location of said inaccessible storage device connected to a server when any one of said plurality of servers fails to access said data; and (d2) an inter-client restoration means, for restoring data which are stored in an inaccessible storage device, using data which are stored in accessible storage devices and parities which are stored in said parity storage device, before the data are restored by said inter-client restoration means, and for accessing restored data which are stored in said parity storage devices after said data are restored by said inter-client restoration means.

2. The client-server system of claim 1, wherein:

said administration means comprises a standby storage device for storing parities;

said inter-server restoration means includes a means for copying said parities stored in said parity storage device into said standby storage device before restoring data; and said inter-client restoration means includes a means for restoring data stored in any one of said storage devices connected to an inaccessible server, using data stored in said storage devices connected to other servers and parities copied in said standby storage device, when said inter-server restoration means is restoring data.

3. The client-server system of claim 1, wherein:

said administration apparatus comprises a second inter-server parity generation means for generating parities from said data which are distributed and stored in said plurality of storage devices connected to said plurality of servers, and for distributing and storing said generated parities in each of said plurality of storage devices.

4. The client-server system of claim 3, wherein:

said administration apparatus comprises a second inter-server restoration means for restoring data stored in any one of said storage devices connected to an inaccessible server, using data stored in said storage devices connected to accessible servers and parities distributed and stored in each of said plurality of storage devices connected to said plurality of servers, when any one of said plurality of servers fails to access said data.

* * * * *